United States Patent
Joao et al.

(10) Patent No.: US 12,301,973 B2
(45) Date of Patent: May 13, 2025

(54) APPARATUS AND METHOD FOR PROVIDING A WIRELESS, PORTABLE, AND/OR HANDHELD, DEVICE WITH SAFETY FEATURES

(71) Applicants: Gregory Thomas Joao, Yonkers, NY (US); Raymond Anthony Joao, Yonkers, NY (US); Christopher Michael Joao, Yonkers, NY (US)

(72) Inventors: Gregory Thomas Joao, Yonkers, NY (US); Raymond Anthony Joao, Yonkers, NY (US); Christopher Michael Joao, Yonkers, NY (US)

( * ) Notice: Subject to any disclaimer, the term of this patent is extended or adjusted under 35 U.S.C. 154(b) by 47 days.

(21) Appl. No.: 17/969,756

(22) Filed: Oct. 20, 2022

(65) Prior Publication Data

US 2023/0038025 A1    Feb. 9, 2023

Related U.S. Application Data

(63) Continuation-in-part of application No. 17/025,998, filed on Sep. 18, 2020, now Pat. No. 11,503,199, which is a continuation of application No. 16/246,511, filed on Jan. 13, 2019, now Pat. No. 10,791,256, which is a continuation of application
(Continued)

(51) Int. Cl.
| | |
|---|---|
| *H04N 23/57* | (2023.01) |
| *G01C 21/36* | (2006.01) |
| *G01S 5/00* | (2006.01) |
| *G01S 19/17* | (2010.01) |

(Continued)

(52) U.S. Cl.
CPC ......... *H04N 23/57* (2023.01); *G01C 21/3679* (2013.01); *H04N 7/18* (2013.01); *G01S 5/0027* (2013.01); *G01S 19/17* (2013.01); *H04M 1/72421* (2021.01)

(58) Field of Classification Search
CPC ... H04N 17/08; H04N 23/57; H04M 1/72421; G01S 5/0027; G01S 19/17; G01C 21/3679
See application file for complete search history.

(56) References Cited

U.S. PATENT DOCUMENTS

| | | | |
|---|---|---|---|
| 6,772,598 B1 * | 8/2004 | Rinehart ............... | F25B 49/005 62/126 |
| 6,847,295 B1 * | 1/2005 | Taliaferro .......... | G08B 21/0225 340/539.11 |

(Continued)

*Primary Examiner* — Jeremiah C Hallenbeck-Huber
(74) *Attorney, Agent, or Firm* — Raymond A. Joao, Esq.

(57) ABSTRACT

An apparatus, including a controller, camera, display, speaker, global positioning system, and sensor or detector which senses or detects a dangerous, hazardous, or unsafe, condition at or in a vicinity of the apparatus. The sensor or detector senses or detects the dangerous, hazardous, or unsafe, condition, and the apparatus provides, via the speaker, an audible alarm, siren blare, or verbal message, containing information regarding the dangerous, hazardous, or unsafe, condition. The apparatus or the controller generates an alert message containing information regarding the dangerous, hazardous, or unsafe, condition. The apparatus transmits the alert message to a central processing computer, to a communication device of a parent, relative, or friend, or other authorized individual, or to a police or law enforcement communication device.

20 Claims, 13 Drawing Sheets

Related U.S. Application Data

No. 15/924,189, filed on Mar. 17, 2018, now Pat. No. 10,218,888, which is a continuation of application No. 14/037,133, filed on Sep. 25, 2013, now Pat. No. 9,961,249, which is a continuation-in-part of application No. 14/025,865, filed on Sep. 13, 2013, now abandoned.

(60) Provisional application No. 61/744,659, filed on Oct. 1, 2012, provisional application No. 61/744,022, filed on Sep. 17, 2012.

(51) Int. Cl.
*H04M 1/72421* (2021.01)
*H04N 7/18* (2006.01)

(56) References Cited

U.S. PATENT DOCUMENTS

| | | | |
|---|---|---|---|
| 8,255,830 B2 * | 8/2012 | Ording | G06F 1/1626 715/825 |
| 9,759,570 B2 | 9/2017 | Joao et al. | |
| 9,804,596 B1 | 10/2017 | Slavin | |
| 11,581,099 B1 | 2/2023 | Rufo et al. | |
| 2006/0099969 A1 * | 5/2006 | Staton | G08B 21/0283 455/456.4 |
| 2006/0099971 A1 * | 5/2006 | Staton | H04W 4/029 455/456.6 |
| 2006/0199612 A1 * | 9/2006 | Beyer, Jr. | H04M 1/72466 455/556.2 |
| 2007/0085993 A1 * | 4/2007 | Brown, Jr. | G01C 3/00 356/3 |
| 2007/0152980 A1 * | 7/2007 | Kocienda | G06F 3/0236 345/173 |
| 2007/0171046 A1 * | 7/2007 | Diem | H04W 12/084 340/539.13 |
| 2008/0032703 A1 * | 2/2008 | Krumm | H04W 4/029 455/456.1 |
| 2009/0219403 A1 * | 9/2009 | McCaffrey | H04N 5/33 348/216.1 |
| 2009/0309751 A1 * | 12/2009 | Kano | H04B 13/005 340/4.4 |
| 2009/0322511 A1 * | 12/2009 | McKenna | H04W 4/90 340/539.11 |
| 2010/0216509 A1 * | 8/2010 | Riemer | H04M 1/72463 455/557 |
| 2011/0046920 A1 * | 2/2011 | Amis | G08B 27/00 709/217 |
| 2011/0248838 A1 * | 10/2011 | Krahenbuhl | G06F 3/0488 345/174 |
| 2011/0298613 A1 * | 12/2011 | Ben Ayed | G08B 25/016 340/539.11 |
| 2012/0105632 A1 * | 5/2012 | Renkis | G08B 13/1966 348/143 |
| 2012/0122558 A1 * | 5/2012 | Lyons | G07F 17/3225 463/25 |
| 2012/0242501 A1 * | 9/2012 | Tran | A61B 5/0024 340/870.02 |
| 2012/0259633 A1 * | 10/2012 | Aihara | H04M 1/72436 704/235 |
| 2013/0029730 A1 * | 1/2013 | Harada | H04M 1/72403 455/566 |
| 2013/0120136 A1 * | 5/2013 | Johnson | G08B 7/06 340/517 |
| 2013/0122968 A1 * | 5/2013 | Miura | H04M 1/0266 455/566 |
| 2013/0260360 A1 * | 10/2013 | Baurmann | G06F 3/14 434/365 |
| 2014/0368601 A1 * | 12/2014 | deCharms | H04N 7/148 348/14.02 |
| 2016/0042637 A1 | 2/2016 | Cahill | |
| 2017/0092109 A1 | 3/2017 | Trundle et al. | |
| 2017/0308692 A1 | 10/2017 | Yano | |
| 2018/0322749 A1 | 11/2018 | Kempel et al. | |
| 2019/0378391 A1 | 12/2019 | Miniard | |
| 2021/0061466 A1 | 3/2021 | Gee | |
| 2021/0129982 A1 | 5/2021 | Collins et al. | |
| 2021/0347500 A1 | 11/2021 | Hagan | |
| 2022/0143523 A1 | 5/2022 | Ng et al. | |

* cited by examiner

APPARATUS AND METHOD FOR PROVIDING A WIRELESS, PORTABLE, AND/OR HANDHELD, DEVICE WITH SAFETY FEATURES

RELATED APPLICATIONS

This application is a continuation-in-part application of U.S. patent application Ser. No. 17/025,998, filed Sep. 18, 2020, and entitled "APPARATUS AND METHOD FOR PROVIDING A WIRELESS, PORTABLE, AND/OR HANDHELD, DEVICE WITH SAFETY FEATURES", now U.S. Pat. No. 11,503,199, the subject matter and teachings of which are hereby incorporated by reference herein in their entirety, which application is a continuation application of U.S. patent application Ser. No. 16/246,511, filed Jan. 13, 2019, and entitled "APPARATUS AND METHOD FOR PROVIDING A WIRELESS, PORTABLE, AND/OR HANDHELD, DEVICE WITH SAFETY FEATURES", now U.S. Pat. No. 10,791,256, the subject matter and teachings of which are hereby incorporated by reference herein in their entirety, which application is a continuation application of U.S. patent application Ser. No. 15/924,189, filed Mar. 17, 2018, and entitled "APPARATUS AND METHOD FOR PROVIDING A WIRELESS, PORTABLE, AND/OR HANDHELD, DEVICE WITH SAFETY FEATURES", now U.S. Pat. No. 10,218,888, the subject matter and teachings of which are hereby incorporated by reference herein in their entirety, which application is a continuation application of U.S. patent application Ser. No. 14/037,133, filed Sep. 25, 2013, and entitled "APPARATUS AND METHOD FOR PROVIDING A WIRELESS, PORTABLE, AND/OR HANDHELD, DEVICE WITH SAFETY FEATURES", now U.S. Pat. No. 9,961,249, which application is a continuation-in-part application of U.S. patent application Ser. No. 14/025,865, filed Sep. 13, 2013, and entitled "APPARATUS AND METHOD FOR PROVIDING A WIRELESS, PORTABLE, AND/OR HANDHELD, DEVICE WITH SAFETY FEATURES", now abandoned, the subject matter and teachings of which are hereby incorporated by reference herein in their entirety. U.S. patent application Ser. No. 14/025,865 claims the benefit of the priority of U.S. Provisional Patent Application Ser. No. 61/744,022, filed Sep. 17, 2012, and entitled "APPARATUS AND METHOD FOR PROVIDING A WIRELESS, PORTABLE, AND/OR HANDHELD, DEVICE WITH SAFETY FEATURES", the subject matter and teachings of which are hereby incorporated by reference herein in their entirety. U.S. patent application Ser. No. 14/037,133 also claims the benefit of the priority of U.S. Provisional Patent Application Ser. No. 61/744,659, filed Oct. 1, 2012, and entitled "APPARATUS AND METHOD FOR PROVIDING A WIRELESS, PORTABLE, AND/OR HANDHELD, DEVICE WITH SAFETY FEATURES", the subject matter and teachings of which are hereby incorporated by reference herein in their entirety.

FIELD OF THE INVENTION

The present invention pertains to an apparatus and method for providing a wireless, portable, and/or handheld, device with safety features and, in particular, to an apparatus and method for providing a wireless, portable, and/or handheld, device with safety features which provides information to a user of the device while texting or reading or writing text messages, while retrieving, reading, composing, and/or sending, e-mails, while taking pictures, while recording information, while playing games, and/or when otherwise using the present invention, or the apparatus or device equipped with the present invention, while walking, moving, or traveling.

BACKGROUND OF THE INVENTION

Cellular telephones, smart phones, personal digital assistants, wireless communication devices, handheld gaming devices, and other wireless, portable, and/or handheld devices are widely used by millions of individuals, of all ages, for making telephone calls, for sending and/or receiving text messages, SMS messages, or e-mail messages, for taking pictures, for recording information, for playing games, and for any number of a wide variety of activities. Many of these uses and activities occur while individual users are walking, jogging, running, driving, or when otherwise moving or while on-the-go, and can cause major distractions which can result in these users walking into or otherwise colliding with objects such as telephone poles, street signs, mailboxes, parked or moving vehicles or other individuals, or other fixed or moving objects.

As a result, distracted use of cellular telephones, smart phones, personal digital assistants, wireless communication devices, handheld gaming devices, and other wireless, portable, and/or handheld devices, pose a hazard to those individuals who engage in these distracted activities as well as any other individuals who may be involved in any mishaps resulting therefrom.

SUMMARY OF THE INVENTION

The present invention pertains to an apparatus and method for providing a wireless, portable, and/or handheld, device with safety features and, in particular, to an apparatus and method for providing a wireless, portable, and/or handheld, device with safety features which provides information to a user of the device while texting or reading or writing text messages, while retrieving, reading, composing, and/or sending, e-mails, while taking pictures, while recording information, while playing games, and/or when otherwise using the present invention, or the apparatus or device equipped with the present invention, while walking, moving, or traveling.

The present invention can be utilized in any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, which can be utilized by an individual while walking or otherwise on the go.

The present invention can be utilized to alert an individual who is walking while engaged in texting, retrieving, reading, or writing e-mail messages, while playing a game, or while otherwise utilizing or operating any wireless device, wireless communication device, cellular telephone, smart phone, personal digital assistant, wireless telephone, portable gaming device, handheld gaming device, or any other device.

The present invention can be utilized in order to provide an individual with a view in the direction in which they are walking or otherwise moving as well as a view of his or her surroundings or surrounding environment. The present invention can also be utilized in order to provide an alert, an alert message or indication, or other information, to an individual regarding an object or structure which might be in the individual's path so as to prevent the individual from colliding with same.

The apparatus of the present invention can be any wireless, portable, or handheld, device, and can, for example, be any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, which has the respective features, components, functionality and functions of each respective device which are know as of the date of the filing of this application.

The apparatus of the present invention includes a case, a keyboard or keypad which can be any type or kind of keyboard, keypad, or a touchscreen keyboard, and a display device for displaying text, a picture, and/or video. The display device can be any type or kind of display, display device, or a touchscreen display. The keyboard and display device can be designed to be integrated into a single touchscreen display such as those used in certain smartphones and tablet computers which are known as of the application filing date of this application.

The apparatus of the present invention can also include a camera, or any number of cameras, which can be any suitable camera or video recording device which can be utilized to obtain and provide a picture or video of a view in a direction in front of the apparatus and/or a view of the surrounding environment. The camera can also be a wide angle camera or video recording device, such as those utilized in connection with automobile or vehicle back-up or rearview camera systems. The camera can be located or positioned on a top side or front facing side of the apparatus of the present invention. The camera may be located or positioned on any side of the apparatus and can be located or positioned at any location or orientation. In another preferred embodiment, any number of cameras can be utilized with the apparatus and they can be located or positioned anywhere and/or at or on any side or location on the apparatus of the present invention. The camera can obtain and provide a view, picture, or video, of the direction and surrounding environment in which an individual is walking while either, texting, retrieving, reading, or writing, an e-mail message, playing a game, or otherwise operating the apparatus of the present invention.

The view, picture, or video, obtained by and provided by the camera can be viewed on the display device or in a display window or display area provided or dedicated therein or thereon for same.

The apparatus of the present invention can also include a night vision device or system which can be, or which can include, a night vision camera or cameras which can be a night vision camera, an infrared camera, or a thermographic camera which can provide a picture or video of a view in a direction in front of the apparatus and/or a view of the surrounding environment during nighttime or in darkness. The night vision device or system can also include a light measuring device, such as, or example, an electric eye device or any other device for detecting darkness which can be utilized to automatically switch on a respective night vision camera, infrared camera, or thermographic camera.

The apparatus of the present invention can also be equipped so that the night vision device or system and/or the associated night vision camera can be manually activated or turned on, or the apparatus can be programmed to automatically activate the night vision device or system and/or the associated night vision camera.

The apparatus can also include at least one collision avoidance sensor(s). The apparatus can also include one or more collision avoidance sensors located or positioned on the top side or front-facing side of the apparatus of the present invention. Any number of collision avoidance sensors can be utilized in connection with the apparatus and they can be located or positioned anywhere and/or at or on any side or location on the apparatus of the present invention. Any number of collision avoidance sensors can be utilized with the apparatus and they can be located or positioned anywhere on the apparatus of the present invention.

The collision avoidance sensor(s) can detect objects, structures, or individuals, in the vicinity of the apparatus and can generate an alert or other indication which can be conveyed via the apparatus to alert or inform an individual using the apparatus of the detected object, structure, or individual so as to allow the individual using the apparatus to avoid a collision with same. The collision avoidance sensor(s) can be of the same type or kind as collision avoidance sensors utilized in automobile or vehicle parking assist systems.

The apparatus can also include a collision avoidance speaker or output device for providing an audible collision avoidance alert or audio information regarding a detected object, structure, or individual, to the individual using the apparatus of the present invention. A visual alert, signal, of message, can also be provided on the display or the display screen or display area.

The apparatus of the present invention can also include a microphone for recording audio information.

The apparatus of the present invention also includes a central processing unit (CPU) which can be the controller of control device for the apparatus and which can control the operation of the apparatus of the present invention. The apparatus of the present invention also includes all of the wireless, portable, or handheld, device systems, which is connected to the CPU and which includes any and/or all of the necessary or desired hardware, software, and/or firmware, of the apparatus, whether the apparatus is a wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device.

The wireless, portable, or handheld, device systems can include any of the necessary and/or desired equipment, hardware, software, or firmware, which is typically found, or which can typically be found, in a respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, in order to facilitate any of the functions or functionality which are found in or provided by these respective devices as of the time of the filing of this application as well as any other equipment, hardware, software, or firmware, which are known to those having ordinary skill in the art of these respective devices as of the time of the filing of this application.

The wireless, portable, or handheld, device systems can include any of the necessary and/or desired equipment, hardware, software, or firmware, for performing any other functionality described herein as being provided by the apparatus of the present invention. The wireless, portable, or handheld, device systems also include a GPS system device, a navigation and mapping system, and any other necessary data and/or information, including programs or programming, for providing navigation instructions via the apparatus of the present invention.

The CPU controls the operation of the apparatus of the present invention. The CPU can be a microprocessor, a microcomputer, a mini-computer, or any other suitable processor, processing device, or control device.

The apparatus of the present invention can also include a camera system which includes the above-described camera. The camera system can be connected to or linked with or to the CPU. The camera system can be one and the same camera system for taking pictures with the apparatus, if so equipped, or the camera system can be dedicated for providing the view, picture, or video, of the direction and surrounding environment in which an individual is walking while either, texting, retrieving, reading, or writing, an e-mail message, playing a game, or otherwise operating the apparatus of the present invention.

The apparatus of the present invention can also include a camera display system which can include the above-described display device and/or the above-described display area, for providing the view, picture, or video, obtained by the camera. The camera display system can be implemented using devices and/or technology which can be the same as, similar to, or analogous to, those camera systems utilized in automobile or vehicle back-up or rearview camera systems which provide a vehicle operator or occupant with a view of the direction in which the vehicle is traveling backwards or backing-up or with a view in the rear of the vehicle or a rearview. The camera display system can be connected to or linked with or to the CPU.

The apparatus of the present invention can also include a collision avoidance system which can include the above-described collision avoidance sensor(s) and/or the above-described collision avoidance output device or speaker. The collision avoidance system can also include and/or utilize the above-described display device and/or the above-described display area in order to provide a visual indication to a user of the apparatus of the present invention. The collision avoidance system can be connected to or linked with or to the CPU.

The apparatus of the present invention can also includes a collision avoidance output device which can also include or utilize the above-described collision avoidance speaker and which can also utilize the above-described display device and/or the above-described display area in order to provide a visual indication to a user of the apparatus of the present invention. The collision avoidance output device can also be connected to or linked with or to the CPU.

The apparatus of the present invention can also include a global positioning system for determining the position of location of the apparatus. The apparatus can also include a navigation and mapping system for providing navigation information and for providing digitized maps or digital maps to a user of the apparatus.

The apparatus of the present invention can also include a night vision device or system which can be, or which can include, a night vision camera or cameras which can be a night vision camera, an infrared camera, or a thermographic camera which can provide a picture or video of a view in a direction in front of the apparatus and/or a view of the surrounding environment during nighttime or in darkness. The night vision device or system can also include a light measuring device, such as, or example, an electric eye device or any other device for detecting darkness which can be utilized to automatically switch on a respective night vision camera, infrared camera, or thermographic camera.

The apparatus of the present invention can also be equipped so that the night vision device or system and/or the associated night vision camera can be manually activated or turned on, or the apparatus can be programmed to automatically activate the night vision device or system and/or the associated night vision camera.

The apparatus of the present invention can be utilized to allow a user to view the direction in which he or she is walking, moving, or traveling, and/or its surrounding environment, while texting or reading or writing text messages, while retrieving, reading, composing, and/or sending, e-mails, while taking pictures, while recording information, while playing games, and/or when otherwise using the present invention while walking, moving, or traveling.

The apparatus of the present invention can detect when a user activates or commences a texting mode of operation, an e-mail mode of operation, a game or gaming mode of operation, a picture taking or video recording mode of operation, a videophone or speakerphone mode of operation, or any other mode of operation which might require that the user take his or her eyes off of his or her direction of walking, movement, or travel.

The apparatus of the present invention can automatically detect the respective mode of operation, and in response thereto, can automatically activate the camera system and provide a display of the view, the picture, or the video, of the direction and/or surrounding environment in front of the user to the user via the display device or display area. The apparatus of the present invention can also activate the collision avoidance system which can detect objects, articles, stationary objects, or other individuals in the user's path of travel and can automatically provide the user with an audible and/or visual alert or indication so as to allow the user to avoid colliding with the detected object, article, stationary object, or other individual.

The apparatus of the present invention can also activate a vibrate mode of operation of the apparatus as an additional or supplemental manner in which to provide notification to the user of the detected object, article, stationary object, or other individual.

The apparatus of the present invention can be utilized in connection with an earpiece or a headset, which can be a wired earpiece of headset which can be connected to the apparatus or a wireless earpiece or headset, such as, but not limited to a Bluetooth earpiece or headset, so that the user can receive audible alerts or indications when the user is in a noisy environment.

The apparatus of the present invention can also detect an end of the respective texting mode of operation, e-mail mode of operation, game or gaming mode of operation, picture taking or video recording mode of operation, videophone or speakerphone mode of operation, or other mode of operation, can automatically deactivate the camera system and the collision avoidance system.

In order to save battery usage, the apparatus of the present invention can be provided with a switch in order to allow the user to switch or select between modes of operation. In this regard, the user can select to operate the apparatus in a "Walking Mode" in which mode the apparatus of the present invention can operate as described above. The user, when not walking, travelling, or moving, can switch the apparatus of the present invention to a "Stationary Mode" which can allow the user to operate the apparatus without using the camera and the collision avoidance sensors, thereby dispensing with the need for being provided with the view, picture, or video, obtained with the camera and/or dispensing with the need to be provided with collision avoidance alerts or indications. In this regard, the apparatus of the present invention, when in the Stationary Mode, can simply be operated to text, e-mail, play a game, take a picture or record video, or use the apparatus in a videophone or speakerphone mode of operation.

The apparatus of the present invention can also be utilized in a same, a similar, and/or an analogous, manner, as described herein, with any wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, so as to allow a user or individual to safely engage in texting or reading or writing text messages, retrieving, reading, or writing e-mail messages, playing a game or engaging in gaming activities, taking pictures, recording video, or performing any other operation(s) with any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, while walking, traveling or moving.

The apparatus of the present invention can be programmed or equipped so that the location, position, and/or orientation, of each of the keyboard, the display, and/or the display area, can be programmably located, positioned, or oriented, by the user. In this regard, a user can design and programmably customize the placement and location of each of the keyboard, the display device, and the display area. In another preferred embodiment, the apparatus of the present invention can be programmed or equipped so that the user can programmably change the size and/or shape of each of the keyboard, the display device, and/or the display area. In this manner, a user of the apparatus of the present invention can customize his or her own user interface.

The apparatus of the present invention can also be equipped with a suitable speakerphone, microphone, voice recognition software, voice to text conversion software, text to audio conversion software, and/or any other requisite and/or desired hardware and/or software to enable the apparatus to operate in a totally hands-free mode of operation when a user is driving or operating a motor vehicle.

The apparatus of the present invention can also be designed or programmed to be operated in "Driving" Mode. Once the "Driving" Mode is activated, the apparatus, which can be any of the herein-described wireless devices, wireless communication devices, mobile communication devices, cellular telephones, video telephones, videophones, smartphones, personal digital assistants, wireless telephones, satellite telephones, tablets, tablet computers, or mobile computers, or any other wireless, portable, or handheld, devices, can be programmed to convert any and/or all text messages or e-mail messages to audio and "read" the respective text or e-mail messages to the user. In an similar manner, the user can dictate messages or responses to messages, as well as text numbers or addresses or e-mail addresses, and the apparatus can convert the user's dictated speech to text, generate a respective text or e-mail message, and automatically send the respective text message or e-mail message to it's recipient. The apparatus can also be programmed to disable the keyboard or keypad so as to disable any and all manual texting or composing of messages. Any and/or all in-coming and outgoing text messages or e-mail messages can be also stored in text form.

In the "Driving" mode, the apparatus of the present invention can also automatically announce an incoming telephone call, answer the telephone call, or initiate a telephone call, and allow the user to engage in the telephone call in a hands-free manner. In the "Driving" mode, the apparatus can also automatically de-activate the keyboard or keypad of the apparatus, de-activate the display device of the apparatus, provide a voice synthesized reading of a message to the user, or automatically compose and/or generate a test message or an e-mail message from user dictation, such as by using speech or voice recognition technology or any other suitable technology.

The apparatus of the present invention can be equipped with a global positioning system (GPS) and a navigation and mapping system which can be utilized to provide the user with information regarding and/or directions to a nearest police department(s) or law enforcement office(s), fire department(s), hospital(s), doctor's office(s), dentist's office(s), restaurant(s), gas station(s) or service or repair station(s), hotel(s), points of interest(s), or an individual, relative(s), friend(s), or acquaintance(s), of the user who may live in or near, a geographic location in which the user may be located at a given point in time based on GPS information determined by the apparatus of the present invention. The apparatus can also provide the user with navigation instructions or directions to the respective police department(s) or law enforcement office(s), fire department(s), hospital(s), doctor's office(s), dentist's office(s), restaurant(s), gas station(s) or service or repair station(s), hotel(s), points of interest(s), or location of the relative(s), friend(s), or acquaintance(s). The user can preprogram the address, telephone number, e-mail address, or other contact information for or regarding any restaurant(s), gas station(s) or service or repair station(s), hotel(s), points of interest(s), or an individual(s), relative(s), friend(s), or acquaintance(s), of the user who may live in or near, a geographic location.

The apparatus of the present invention can also be programmed and/or equipped to perform the necessary processing routines for determining the position or location, and/or municipal, geographical, jurisdictional, political, or other, subdivision location, of the apparatus at any given time. The apparatus can also be programmed with the address, telephone number, e-mail address, or other contact information for or regarding any police department(s) or law enforcement office(s), fire department(s), hospital(s), doctor's office(s), dentist's office(s), restaurant(s), gas station(s) or service or repair station(s), hotel(s), and/or points of interest(s), in each municipal, geographical, jurisdictional, political, or other, subdivision (hereinafter referred to as "municipal subdivision").

The apparatus can be utilized to continuously monitor the position or location of the apparatus, and for each municipal subdivision travelled in or through, the apparatus can identify and provide the user with the respective address, telephone number, e-mail address, or other contact information, for or regarding any identified police department(s) or law enforcement office(s), fire department(s), hospital(s), doctor's office(s), dentist's office(s), restaurant(s), gas station(s) or service or repair station(s), hotel(s), and/or points of interest(s), in that municipal subdivision, and can also be programmed to identify and provide the user with the respective address, telephone number, e-mail address, or other contact information for or regarding any identified individual(s), relative(s), friend(s), or acquaintance(s), of the user who may live in or near, that municipal subdivision.

The apparatus of present invention can also be pre-programmed with any and all data and/or information for providing the user with navigation instructions to any identified police department(s) or law enforcement office(s), fire department(s), hospital(s), doctor's office(s), dentist's office(s), restaurant(s), gas station(s) or service or repair station(s), hotel(s), and/or points of interest(s), in that municipal subdivision, or with navigation instructions to a location, residence, or place business of the any identified individual(s), relative(s), friend(s), or acquaintance(s), who may live in or near, that municipal subdivision.

In the above-described manner, the apparatus and method of the present invention can be used to provide continuous monitoring of the position or location of the apparatus and can provide continuous information to user regarding the municipal subdivision in which the user and the apparatus are located as well as provide any and/or all of the herein-described information, including the name, address, telephone number, text message address or number, or e-mail address, of and for any or all of the identified nearest police department(s) or law enforcement office(s), fire department(s), hospital(s), doctor's office(s), dentist's office(s), restaurant(s), gas station(s) or service or repair station(s), hotel(s), points of interest(s), or any individual, relative(s), friend(s), or acquaintance(s), of the user, in the identified municipal subdivision.

The apparatus of the present invention can also be programmed to send newly composed messages or previously prepared or pre-stored emergency messages which can be sent to report emergency situations to local police departments, fire departments, emergency responders, parents, relatives, friend (police, fire, parents). The message can include the GPS position or location data or information regarding the location of the apparatus at the time the emergency message is transmitted from the apparatus. The apparatus can also be programmed to send pre-stored messages reporting emergency situations, which messages can be retrieved and sent by using a programmed speed dial key or speed dialing keys.

The apparatus and method of the present invention can be utilized to report on the whereabouts of a user. As and for an example, that user can be a child. The user or child can, using the GPS system of the apparatus, ascertain and store his or her position or location, which can be the position or location of the apparatus within a municipal subdivision or other geographical location. For example, a child, who might be travelling away from home, can store his or her current location within a municipal subdivision or other geographical location in the apparatus. If the child should thereafter travel, whether expectedly or unexpectedly, beyond a pre-determined radius (hereinafter "the safe area") from that stored position or location, the apparatus can be programmed to generate and transmit an alert message alerting a parent or other authorized individual that the child has left that pre-determined position or location, the time the child left the safe area, and the child's current position or location.

The message can also contain any picture(s) of any view(s) obtained by the camera or night vision camera which might show the area or environment in which the apparatus is located. In this manner, if a child should leave the predetermined safe area for any reason, the apparatus can automatically detect same and notify the child's parent or another authorized individual by sending any suitable text message or e-mail message to a communication device utilized by or associated with the parent or other authorized individual. Although described herein as being utilized to allow a parent or authorized individual to monitor the whereabouts of a child, the apparatus can also be utilized by any authorized individuals to monitor the whereabouts of any other individual(s) of any and/or all ages.

The apparatus of the present invention can also be programmed to identify a police department or law enforcement office, in an manner described herein as be capable of being performed by the apparatus and can transmit the message to a communication device utilized by or associated with the police department or law enforcement office.

The apparatus can thereafter compute the position or location of the child user's apparatus and generate and transmit messages to the parent and/or to the police department or law enforcement office at predetermined intervals and on an on-going basis in order to track or monitor the movement of the child user's apparatus. The messages can contain any picture(s), video, or video clips, of any view(s) obtained by the camera or night vision camera which might show the area or environment in which the apparatus is located and/or the path of travel of the apparatus and the child.

The apparatus can also be provided with any of the data and/or information needed or desired for performing any of the herein-described processing routines for determining the GPS position or location of the apparatus, for identifying the municipal subdivision where the apparatus is located, for identifying the appropriate police department or law enforcement office, for identifying the parent or other authorized individual, for generating and transmitting the herein-described alert message(s) to the appropriate parent, authorized individual, and/or police department or law enforcement office, and for performing any and/or all of the processing routines described herein as being performed by the apparatus and method of the present invention.

Although described herein as being utilized to allow a parent or authorized individual to monitor the whereabouts of a child user of the apparatus, it is important to note that the apparatus can also be utilized by any authorized individuals to monitor the whereabouts of any other individual(s) of any and/or all ages. It is also important to note that any video or video clip(s) which can be sent along with any alert message(s) can be of any duration or length of time.

The apparatus of the present invention can also be utilize in conjunction with, or in connection with, a central processing computer or a server computer which can be accessed by the parent or authorized individual and/or by police department or law enforcement personnel to receive and retrieve any of the herein-described alert messages, pictures, video, or video clips, reset signals, and/or any messages sent by and between the child user, the parent of authorized individual, or police or law enforcement personnel. In this manner, the central processing computer or server computer can serve as a centralized computer system and/or as a hub of operations and/or centralized record keeping repository for monitoring and tracking the location and/or movement of children and other individuals via the apparatus of the present invention.

The central processing computer or server computer can also receive any respective alert message, store same in a file or record for the child user, generate and transmit an notification message to a communication device used by or associated with the parent or other authorized individual and/or police or law enforcement personnel, and, upon request by the parent or other authorized individual and/or police or law enforcement personnel, transmit the respective alert message(s) and any other attendant or accompanying information, picture(s), video, or video clip(s), to the communication device used by or associated with the parent or other authorized individual and/or police or law enforcement personnel.

The central processing computer or server computer can also receive, store, and relay, any text or e-mail messages which may be transmitted to, from, or between, any of the child user, the parent or other authorized individual, or the police or law enforcement personnel, as well as receive, store, and relay, any reset signals sent from a parent or other authorized individual.

The apparatus can also automatically record and store video or a video clip for any pre-determined period of time. The video or video clip can be stored in a memory device of and/or at the apparatus and/or the video or video clip can be automatically transmitted to a central processing computer or server computer for retrieval by any authorized person. The apparatus can also record and continuously store the recorded video or video clip obtained by the camera or night vision camera at the apparatus or in a memory device utilized in or with the apparatus. For example, a video or video clip recorded for the most recent hour of operation, or any other pre-determined time period, can be recorded and stored.

The stored video or video clip can be transmitted to, and stored at, a central processing computer or server computer from which it can be retrieved by any authorized individual using a personal computer, a personal communication device, a tablet computer, a laptop or notebook computer, a personal digital assistant, a cellular telephone, a wireless telephone, or any other communication device. In this manner, for example, a parent can ascertain, from the video or the video clip, a last know whereabouts of a child or any other person in or under their care when they may have been texting or reading or writing text messages, retrieving, reading, or writing e-mail messages, playing a game or engaging in gaming activities, taking pictures, recording video, or performing any other operation(s) with any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, while walking, traveling or moving.

The apparatus of the present invention can also be utilized in another system or in a network environment which can include the apparatus of the present invention, which can be any respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, described herein, a central processing computer or server computer which can control an operation of the system, a personal communication device, and a police or law enforcement communication device. Any number of apparatuses, central processing computers or server computers, personal communication devices, and police or law enforcement communication devices can be utilized in the system.

Any of the personal communication devices or any of the police or law enforcement communication devices can be any one or more of any of the communication devices, wireless communication devices, wireless telephones, mobile telephones, cellular telephones, landline telephones, videophones, video telephones, personal digital assistants, computers, personal computers, tablets, tablet computers, digital music players or devices, handheld or portable music player devices or music playing devices, portable gaming devices, handheld gaming devices, handheld video game consoles, portable game consoles, or any other wireless, portable, or handheld, devices, or e-mail servers, or any other communication devices or any other devices described herein as being used as an apparatus of the present invention.

Any of the apparatuses of the present invention, the central processing computers or server computers, the personal communication devices, and the police or law enforcement communication devices can communicate with any other apparatus, central processing computer or server computer, personal communication device, or law enforcement communication device, in a bi-directional manner and via any communication network, wireless communication network, satellite communication network, the Internet and/or the World Wide Web, and/or any other communication network or any combination or same.

The apparatus of the present invention can also transmit the video or a video clip to the personal communication device of an authorized person or entity and/or to the police or law enforcement communication device in addition to transmitting the video or video clip to the central processing computer.

Any authorized person or entity or the police or law enforcement personnel can also access the apparatus directly via a respective communication device and can also request and receive a transmission of the video or video clip from the apparatus. In the above manner, video or video clips, which might provide information regarding the safety and/or whereabouts of any user of the apparatus can be readily obtained, stored, archived, and retrieved by any authorized person or entity or by police or law enforcement personnel.

The apparatus of the present invention can also be designed, equipped, and/or programmed, so that the operation of the same in any of the embodiments described herein can be voice-activated, automatically activated, and/or manually activated, by the user.

The camera of the apparatus can be activated when the apparatus is moving as well as when the apparatus is stationary or not moving. In this regard, in addition to the apparatus providing, via the display device or the display area, a view, picture, or video, obtained by the camera in a direction of the travel or a direction of movement of the apparatus, the apparatus can also provide, via the display device or the display area, a view, picture, or video, obtained by or with the camera by the apparatus or from the apparatus.

Any of the pictures, video, or video clips, obtained, recorded, stored, transmitted, or provided, by the apparatus of the present invention can also include audio recordings or audio information as well. The microphone of the apparatus can record audio information which audio information can be included with any picture, video, or video clip, obtained, recorded, stored, transmitted, or provided by the apparatus of the present invention.

The apparatus can also time stamp and/or date stamp any pictures, video, or video clips, obtained, recorded, stored, transmitted, or provided, by the apparatus of the present invention.

The apparatus, and/or any it its herein-described components, devices, equipment, or the central processing unit (CPU), can be programmed to determine the position or location of the apparatus at the time and location when and where a picture, video, or video clip, is being obtained or recorded, determine or identify the municipal subdivision where the picture, video, or video clip is being obtained or recorded, and place or insert a location stamp in, on, or into or onto ("location stamp"), any pictures, video, or video clips, obtained, recorded, stored, transmitted, or provided, by the apparatus of the present invention.

The apparatus of the present invention can be equipped with sensors or detectors for sensing or detecting any one or more of a number of unsafe conditions and/or a danger at or near, or in a vicinity of, the apparatus. The apparatus utilized in these applications can be any type or kind of cellular telephone, smartphone, personal digital assistant, wireless communication device, mobile communication device, video telephone, videophone, wireless telephone, satellite telephone, tablet, tablet computer, mobile computer, portable gaming device, handheld gaming device, handheld video game console, portable game console, or any other wireless, portable, or handheld, device, can also include and/or can also be equipped with, a thermometer, a heat sensor, a sensor for detecting or for sensing intense heat, a sensor for detecting or for sensing an unsafe temperature, a smoke detector, a fire detector, a natural gas detector or sensor, a propane detector or sensor, a methane detector or sensor, a Freon detector or sensor, a chlorine detector or sensor, a carbon monoxide (CO) detector or sensor, or a detector or sensor for detecting or sensing any other gas or harmful substance or any other substance(s) or material(s), and/or a detector or sensor for detecting or sensing any other condition which can or might justify providing a suitable alert message or notification message, or report, to a parent, a relative, a friend, a local police department, a local or other fire department, and/or an emergency responder.

The apparatus can also include a sensor/detector system which can include a thermometer, a heat sensor, a sensor for detecting or for sensing intense heat, a sensor for detecting or for sensing an unsafe temperature, a smoke detector, a fire detector, a natural gas detector or sensor, a propane detector or sensor, a methane detector or sensor, a Freon detector or sensor, a chlorine detector or sensor, a carbon monoxide (CO) detector or sensor, or a detector or sensor for detecting or sensing any other gas or harmful substance or any other substance(s) or material(s), and/or a detector or sensor for detecting or sensing any other condition which can or might justify providing a suitable alert message or notification message, or report, to a parent, a relative, a friend, a local police department, a local or other fire department, and/or an emergency responder.

The apparatus, upon detecting any danger or dangerous or unsafe condition with any of the sensors or detectors in the sensor/detector system, can also provide an audible alarm, a siren blare, or an audible and verbal message, so as to alert the individual, or any individuals in close proximity to the apparatus, of any detected and respective danger or dangerous or unsafe condition.

The apparatus can also generate and can transmit, to the central processing computer, to a respective personal communication device(s) of the parent, relative, or friend, or other authorized individual, and/or to a police or law enforcement communication device(s), an alert message or notification message, or report, which can contain information regarding the day, data, time, and/or position or location of the apparatus, as can be determined by the global positioning system (GPS) of the apparatus, along with information regarding the respective sensed or detected danger or dangerous of unsafe condition, which can be any one or more of, an unsafe temperature as sensed or detected by the thermometer, a sensed or detected unsafe level of heat as sensed or detected by the heat sensor a sensed or detected intense heat as sensed or detected by the sensor or detector for sensing intense heat, a sensed or detected unsafe temperature, which can be either too cold or too hot, by the sensor for detecting or for sensing an unsafe temperature, a sensed or detected presence of smoke as sensed or detected by the smoke detector, a sensed or detected presence of fire as sensed or detected by the fire detector, a sensed or detected presence of natural gas as sensed or detected by natural gas detector or sensor, a sensed or detected presence of propane gas as sensed or detected by the propane detector or sensor, a sensed or detected presence of methane gas as sensed or detected by the methane detector or sensor, a sensed or detected presence of Freon gas as sensed or detected by the Freon detector or sensor, a sensed or detected presence of Chlorine gas a sensed or detected by the chlorine detector or sensor, a sensed or detected presence of carbon monoxide (CO) as sensed or detected by the carbon monoxide (CO) detector or sensor, and/or a sensed or detection of the presence of any other harmful substance or hazardous substance, as sensed or detected by a respective sensor or detector for sensing any other gas or harmful substance or any other substance(s) or material(s).

In this regard, the apparatus of the present invention allows an individual, or any pet or animal, to be notified, via the apparatus, of any sensed or detected danger, and/or of any sensed or detected dangerous or unsafe condition, at any time and anywhere he, she, or it may be located.

As used herein, the term "individual" means any human being, natural person, animal, non-human being animal, or pet. In this regard, the use of the various preferred and/or other embodiments or the apparatus, or any other apparatus described herein or otherwise, and methods of the present invention, can be utilized by and for, and to provide monitoring services or functions for, any individual or individuals which can be any human being(s), natural person(s), animal(s), non-human being animal(s), or pet(s).

In this regard, the apparatus, or any other apparatus described herein or otherwise, and methods of the present invention, can be utilized in order to provide a personal monitoring and safety apparatus or device for any individual in or for which the apparatus is being utilized.

The case of the apparatus of the present invention can be any case or housing of the respective apparatus in or with which it is being utilized, or the case can be any protective case, casing, or housing, which can be applied to, affixed to, attached to, the respective apparatus with which it is utilized, or can be any protective case, casing, or housing, into which the respective apparatus can be inserted or encased within. In this regard, the case of the apparatus can be equipped with any of the herein-described components and/or sensors and can be connected to, or linked with, the respective CPU of the apparatus of the present invention. Any of the herein-described components and/or sensors and can be connected to, or linked with, the respective CPU of the apparatus using any suitable wireless technology or equipment, Bluetooth technology or equipment, and/or any other suitable or appropriate wireless technology or equipment. The case of the apparatus can applied to the apparatus, or can be removed from the apparatus, at any time.

The apparatus can also be a wearable device, and/or can be attached or connected to or with a wearable device. The apparatus can be attached to or connected to a belt, an armband, a compression sleeve, a wristband, a bracelet, a necklace, a body camera, a collar of any type or kind of pet or other animal, an ankle bracelet, a shoe, or any other article of clothing or clothing accessory and/or any other wearable item, device, or article.

The apparatus can also be integrated with or within a belt, an armband, a compression sleeve, a wristband, a bracelet, a necklace, a body camera, a collar of any type or kind of pet or other animal, an ankle bracelet, a shoe, or any other article of clothing or clothing accessory and/or any other wearable item, device, or article.

DESCRIPTION OF THE PREFERRED EMBODIMENTS

Figure 1:
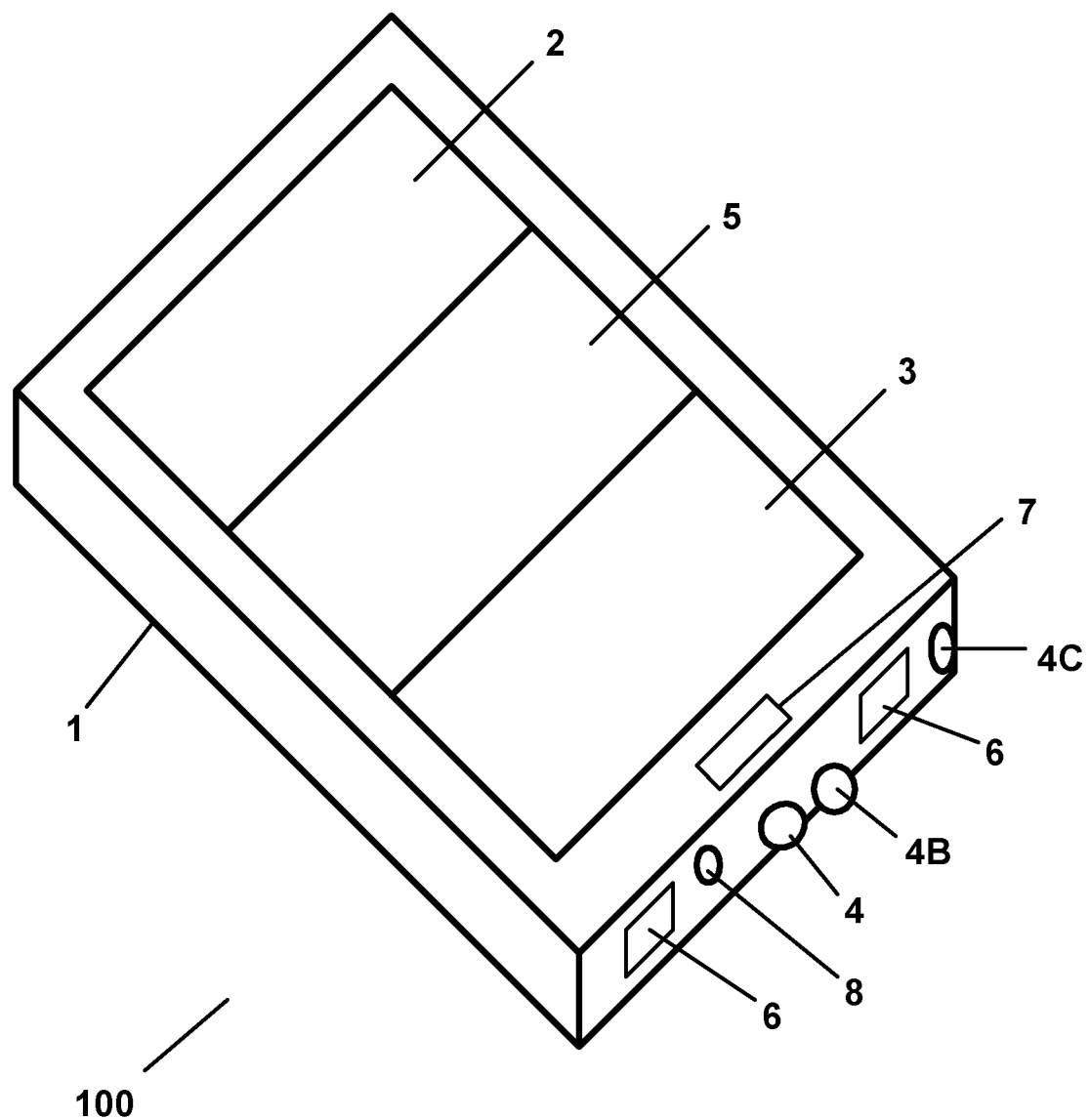
FIG. 1 illustrates a preferred embodiment of a wireless, portable, or handheld, device in or with which the apparatus of the present invention can be utilized.

The present invention pertains to an apparatus and method for providing a wireless, portable, and/or handheld, device with safety features and, in particular, to an apparatus and method for providing a wireless, portable, and/or handheld, device with safety features which provides information to a user of the device while texting or reading or writing text messages, while retrieving, reading, composing, and/or sending, e-mails, while taking pictures, while recording information, while playing games, and/or when otherwise using the present invention, or the apparatus or device equipped with the present invention, while walking, moving, or traveling.

The present invention can be utilized in any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, which can be utilized by an individual while walking or otherwise on the go. The present invention can be utilized to alert an individual who is walking while engaged in texting, retrieving, reading, or writing e-mail messages, while playing a game, or while otherwise utilizing or operating any wireless device, wireless communication device, cellular telephone, smart phone, personal digital assistant, wireless telephone, portable gaming device, handheld gaming device, or any other device. The present invention can be utilized in order to provide an individual with a view in the direction in which they are walking or otherwise moving as well as a view of his or her surroundings or surrounding environment. The present invention can also be utilized in order to provide an alert, an alert message or indication, or other information, to an individual regarding an object or structure which might be in the individual's path so as to prevent the individual from colliding with same.

As used herein, the terms "wireless device", "portable device", or "handheld device" refers any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device with which the apparatus and method of the present invention can or may be used in order to provide the features and functionality described herein as being performed by the present invention.

Applicant hereby incorporates by reference herein the subject matter and teachings of U.S. patent application Ser. No. 17/025,998, filed Sep. 18, 2020, and entitled "APPARATUS AND METHOD FOR PROVIDING A WIRELESS, PORTABLE, AND/OR HANDHELD, DEVICE WITH SAFETY FEATURES", the subject matter and teachings of which are hereby incorporated by reference herein in their entirety.

Applicant hereby incorporates by reference herein the subject matter and teachings of U.S. Provisional Patent Application Ser. No. 61/744,659, filed Oct. 1, 2012, and entitled "APPARATUS AND METHOD FOR PROVIDING A WIRELESS, PORTABLE, AND/OR HANDHELD, DEVICE WITH SAFETY FEATURES", the subject matter and teachings of which are hereby incorporated by reference herein in their entirety.

Applicant also hereby incorporates by reference herein the subject matter and teachings of U.S. Provisional Patent Application Ser. No. 61/744,022, filed Sep. 17, 2012, and entitled "APPARATUS AND METHOD FOR PROVIDING A WIRELESS, PORTABLE, AND/OR HANDHELD, DEVICE WITH SAFETY FEATURES", the subject matter and teachings of which are hereby incorporated by reference herein in their entirety.

FIG. 1 illustrates a preferred embodiment of the apparatus of the present invention. In a preferred embodiment, the apparatus is a wireless, portable, or handheld, device. With reference to FIG. 1, the apparatus is denoted by the reference number 100. In a preferred embodiment, the apparatus 100 of FIG. 1, can, for example, be any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, which has the respective features, components, functionality and functions of each respective device which are know as of the date of the filing of this application.

As and for an example, the apparatus 100 of FIG. 1 can be described as being a cellular telephone, smartphone, or personal digital assistant. Although described in an exemplary embodiment as being a cellular telephone, smartphone, or personal digital assistant, the apparatus of FIG. 1 can also be any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices.

With reference to FIG. 1, the apparatus 100 includes a case 1, a keyboard or keypad 2 (hereinafter "keyboard 2") which can be any type or kind of keyboard, keypad, or a touchscreen keyboard, and a display device 3 for displaying text, a picture, and/or video. The display device 3 can be any type or kind of display, a display device, or a touchscreen display. Although the apparatus 100 in FIG. 1 is illustrated as having a keyboard 2 separate and apart form the display device 3, in another preferred embodiment, the keyboard 2 and display device 3 can be designed to be integrated into a single touchscreen display such as those used in certain smartphones and tablet computers which are known as of the application filing date of this application.

With reference once again to FIG. 1, the apparatus 100, can also include a camera 4 or any number of cameras 4. In the preferred embodiment, the camera 4 can be any suitable camera or video recording device which can be utilized to obtain and provide a picture or video of a view in a direction in front of the apparatus 100 and/or a view of the surrounding environment. In another preferred embodiment, the apparatus 100 can also include a night vision device or system 4A (not shown) which can be, or which can include, a night vision camera 4B or cameras 4B which can be a night vision camera, an infrared camera, or a thermographic camera which can provide a picture or video of a view in a direction in front of the apparatus 100 and/or a view of the surrounding environment during nighttime or in darkness.

The night vision device or system 4A can also include a light measuring device 4C, such as, or example, an electric eye device or any other device for detecting darkness which can be utilized to automatically switch on a respective night vision camera, infrared camera, or thermographic camera. In another preferred embodiment, the apparatus 100 can be equipped so that the night vision device or system 4A and/or the associated night vision camera 4B can be manually activated or turned on, or the apparatus 100 can be programmed to automatically activate the night vision device or system 4A and/or the associated night vision camera 4B. In the preferred embodiment, a night vision camera 4B is also utilized along with camera 4 as shown in FIG. 1.

In a preferred embodiment, the camera 4 can also be a wide angle camera or video recording device, such as those utilized in connection with automobile or vehicle back-up or rearview camera systems. In a preferred embodiment, the camera 4 is located or positioned on a top side or front facing side of the apparatus 100 as shown in FIG. 1. Although, the camera 4 is shown as being located or positioned on a top side or front facing side of the apparatus 100 in FIG. 1, and at the approximate center of said side, it is important to note that the camera 4 may be located or positioned on any side of the apparatus 100 and can be located or positioned at any location or orientation. In another preferred embodiment, any number of cameras 4 can be utilized with the apparatus 100 and they can be located or positioned anywhere and/or at or on any side or location on the apparatus 100. In a preferred embodiment, the camera 4 obtains and provides a view, picture, or video, of the direction and surrounding environment in which an individual is walking while either, texting, retrieving, reading, or writing, an e-mail message, playing a game, or otherwise operating the apparatus 100.

In a preferred embodiment, the view, picture, or video, obtained by and provided by the camera 4 can be viewed on the display device 3 or in a display window or display area 5 provided or dedicated therein or thereon for same. With reference once again to FIG. 1, the apparatus 100 also includes at least one collision avoidance sensor(s) 6. In the preferred embodiment of FIG. 1, the apparatus 100 can also include one or more collision avoidance sensors 6 located or positioned on the top side or front-facing side of the apparatus 100. It is important to note, however, that the any number of collision avoidance sensors 6 can be utilized in connection with the apparatus 100 and they can be located or positioned anywhere and/or at or on any side or location on the apparatus 100. In another preferred embodiment, any number of collision avoidance sensors 6 can be utilized with the apparatus 100 and they can be located or positioned anywhere on the apparatus 100.

In a preferred embodiment, the collision avoidance sensor(s) 6 can detect objects, structures, or individuals, in the vicinity of the apparatus 100 and can generate an alert or other indication which can be conveyed via the apparatus 100 to alert or inform an individual using the apparatus 100 of the detected object, structure, or individual so as to allow the individual using the apparatus 100 to avoid a collision with same. In a preferred embodiment, the collision avoidance sensor(s) 6 can be of the same type or kind as collision avoidance sensors utilized in automobile or vehicle parking assist systems.

With reference once again to FIG. 1, the apparatus 100 can also include a collision avoidance speaker 7 for providing an audible collision avoidance alert or audio information regarding a detected object, structure, or individual, to the individual using the apparatus 100. In a preferred embodiment, a visual alert, signal, of message, can also be provided on the display 3 or the display screen or display area 5.

With reference once again to FIG. 1, the apparatus 100 can also include a microphone 8 for recording audio information.

Figure 2:
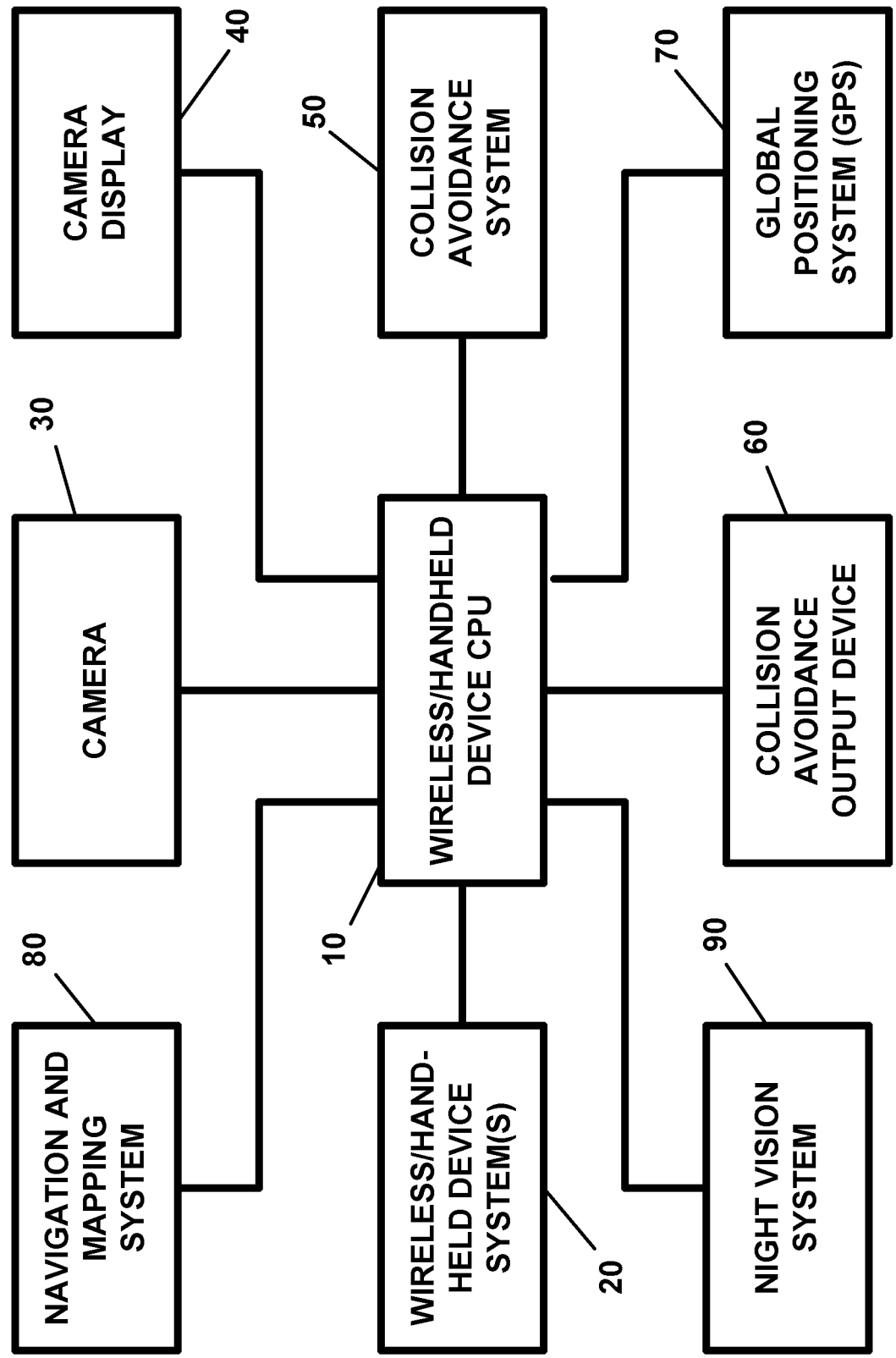
FIG. 2 illustrates a preferred embodiment of the apparatus of the present invention, in block diagram form.
Figure 3:
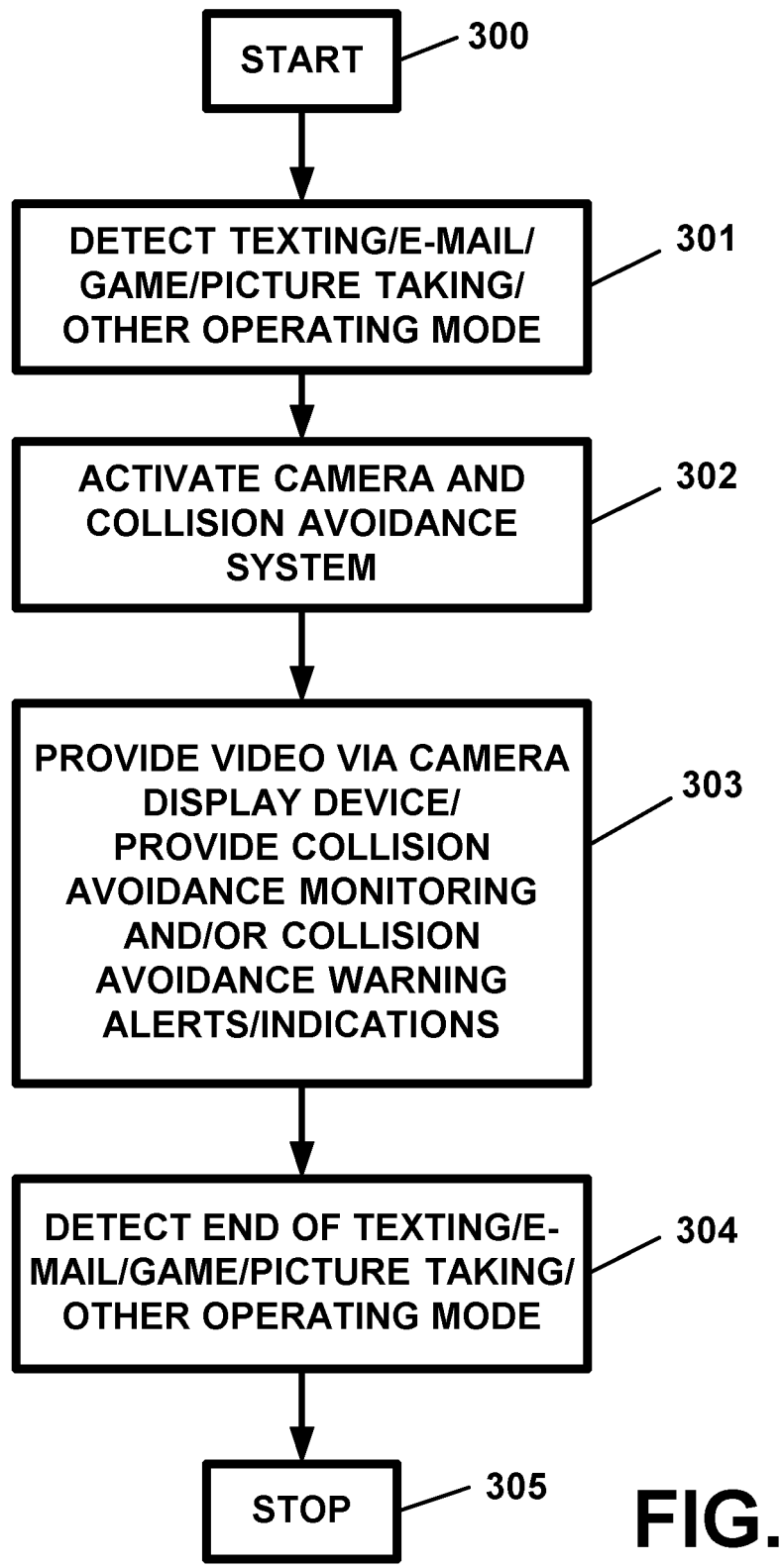
FIG. 3 illustrates a preferred embodiment operation of the apparatus of the present invention, in flow diagram form.

FIG. 2 illustrates a preferred embodiment of the apparatus 100 of the present invention, in block diagram form. With reference to FIG. 3, the apparatus 100 includes a central processing unit (CPU) 10 which can be the controller of control device for the apparatus 100 and which can control the operation of the apparatus 100. The apparatus 100 also includes all of the wireless, portable, or handheld, device systems 20, which is connected to the CPU 10 and which includes any and/or all of the necessary or desired hardware, software, and/or firmware, of the apparatus 100, whether the apparatus 100 is a wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device.

The wireless, portable, or handheld, device systems 20 can include any of the necessary and/or desired equipment, hardware, software, or firmware, which is typically found, or which can typically be found, in a respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, in order to facilitate any of the functions or functionality which are found in or provided by these respective devices as of the time of the filing of this application as well as any other equipment, hardware, software, or firmware, which are known to those having ordinary skill in the art of these respective devices as of the time of the filing of this application. The wireless, portable, or handheld, device systems 20 can include any of the necessary and/or desired equipment, hardware, software, or firmware, for performing any other functionality described herein as being provided by the apparatus 100 of the present invention.

The CPU 10 controls the operation of the apparatus 100. In a preferred embodiment, the CPU 10 can be a microprocessor, a microcomputer, a mini-computer, or any other suitable processor, processing device, or control device.

With reference once again to FIG. 2, the apparatus 100 can also include a camera system 30 which includes the camera 4 or cameras 4. The camera system 30, in a preferred embodiment, is connected to or linked with or to the CPU 10. The camera system 30 can be one and the same camera system for taking pictures with the apparatus 100, if so equipped, or the camera system 30 can be dedicated for providing the view, picture, or video, of the direction and surrounding environment in which an individual is walking while either, texting, retrieving, reading, or writing, an e-mail message, playing a game, or otherwise operating the apparatus 100.

The apparatus 100 can also include a camera display system 40 which can include the display device 3 and/or the display area 5, for providing the view, picture, or video, obtained by the camera 4. In a preferred embodiment, the camera system 30 can be implemented using devices and/or technology which can be the same as, similar to, or analogous to, those camera systems utilized in automobile or vehicle back-up or rearview camera systems which provide a vehicle operator or occupant with a view of the direction in which the vehicle is traveling backwards or backing-up or with a view in the rear of the vehicle or a rearview. The camera display system 40, in a preferred embodiment, is connected to or linked with or to the CPU 10.

The apparatus 100 can also include a collision avoidance system 50 which can include the collision avoidance sensor(s) 6 and/or the collision avoidance speaker 7. The collision avoidance system 50 can also include and/or utilize the display device 3 and/or the display area 5 in order to provide a visual indication to a user of the apparatus 100. The collision avoidance system 50, in a preferred embodiment, is connected to or linked with or to the CPU 10.

The apparatus 100 can also includes a collision avoidance output device 60 which can also include or utilize the collision avoidance speaker 7 and which can also utilize the display device 3 and/or the display area 5 in order to provide a visual indication to a user of the apparatus 100. The collision avoidance output device 60, in a preferred embodiment, is connected to or linked with or to the CPU 10.

The apparatus 100 can also include a global positioning system (GPS) 70 for determining the position of location of the apparatus 100. The apparatus 100 can also include a navigation and mapping system 80 for providing navigation information, directions, instructions, and/or for providing digitized maps or digital maps to a user of the apparatus 100.

The apparatus 100 of the present invention can also include a night vision system 90 which can be, or which can include, the night vision device or system 4, and the night vision camera or cameras 4B. The night vision camera or cameras 4B can be any night vision camera, an infrared camera, or a thermographic camera which can provide a picture or video of a view in a direction in front of the apparatus and/or a view of the surrounding environment during nighttime or in darkness. The night vision system 90 can also include the above-mentioned light measuring device, such as, or example, an electric eye device or any other device for detecting darkness which can be utilized to automatically switch on a respective night vision camera, infrared camera, or thermographic camera.

The apparatus 100 of the present invention can also be equipped so that the night vision system 90 and/or the associated night vision camera 4B can be manually activated or turned on, or the apparatus 100 can be programmed to automatically activate the night vision system 90 and/or the associated night vision camera 4B.

It is important to note that the wireless, portable, or handheld, device systems 20 can also include any and all hardware, equipment, software, and any programs or applications, for providing any and/or all of the functions and/or functionality of the respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device. In addition, the wireless, portable, or handheld, device systems 20 can also include a global positioning device or system, a navigation and mapping system, and a night vision system.

The apparatus 100 and method of the present invention can be utilized, in a preferred embodiment, to allow a user of the apparatus 100 to view the direction in which he or she is walking, moving, or traveling, and/or its surrounding environment, while texting or reading or writing text messages, while retrieving, reading, composing, and/or sending, e-mails, while taking pictures, while recording information, while playing games, and/or when otherwise using the present invention, or the apparatus or device equipped with the present invention, while walking, moving, or traveling.

In a preferred embodiment, the apparatus 100 can detect when a user activates or commences a texting mode of operation of the apparatus 100, an e-mail mode of operation of the apparatus 100, a game or gaming mode of operation of the apparatus 100, a picture taking or video recording mode of operation of the apparatus 100, a videophone or speakerphone mode of operation, or any other mode of operation which might require that the user take his or her eyes off of his or her direction of walking, movement, or travel.

The apparatus 100 or the CPU 10 can automatically detect the respective mode of operation, and in response thereto, can automatically activate the camera system 30 and provide a display of the view, the picture, or the video, of the direction and/or surrounding environment in front of the user to the user via the display device 3 or display area 5. The apparatus 100 or the CPU 10 can also activate the collision avoidance system 50 which can detect objects, articles, stationary objects, or other individuals in the user's path of travel and can automatically provide the user with an audible and/or visual alert or indication so as to allow the user to avoid colliding with the detected object, article, stationary object, or other individual. The apparatus 100 or the CPU 10 can also activate a vibrate mode of operation of the apparatus 100 as an additional or supplemental manner in which to provide notification to the user of the detected object, article, stationary object, or other individual.

The apparatus 100 or the CPU 10, upon detecting the end of the respective texting mode of operation of the apparatus 100, the e-mail mode of operation of the apparatus 100, the game or gaming mode of operation of the apparatus 100, the picture taking or video recording mode of operation of the apparatus 100, a videophone or speakerphone mode of operation, or other mode of operation, can automatically deactivate the camera system 30 and the collision avoidance system 50.

FIG. 3 illustrates a preferred embodiment operation or method of using the apparatus 100 and method of the present invention, in flow diagram form. With reference to FIG. 3, the operation of the apparatus 100 commences at step 300. At step 301, the apparatus 100 and/or the CPU 10 awaits and automatically detects when a user activates or commences a texting mode of operation of the apparatus 100, an e-mail mode of operation of the apparatus 100, a game or gaming mode of operation of the apparatus 100, a picture taking or video recording mode of operation of the apparatus 100, a videophone or speakerphone mode of operation, or any other mode of operation which might require that the user take his or her eyes off of his or her direction of walking, movement, or travel.

The CPU 10 automatically detects the respective mode of operation, and in response thereto, at step 302, the CPU 10 can automatically activate the camera system 30 and the camera 4 or the night vision camera 4B depending upon the lighting conditions. In a preferred embodiment, in and during daylight, the camera 4 can be automatically activated, while in or during darkness or the onset of darkness, the night vision camera 4B can be automatically activated by the night vision device or system 4A and/or by the light measuring device 4C. In a preferred embodiment, the night vision camera 4B can be automatically activated when darkness is detected by night vision device or system 4A and/or by the light measuring device 4C. At step 302, the CPU 10 can also activate the collision avoidance system 50 which can detect objects, articles, stationary objects, or other individuals in the user's path of travel.

Figure 4A:
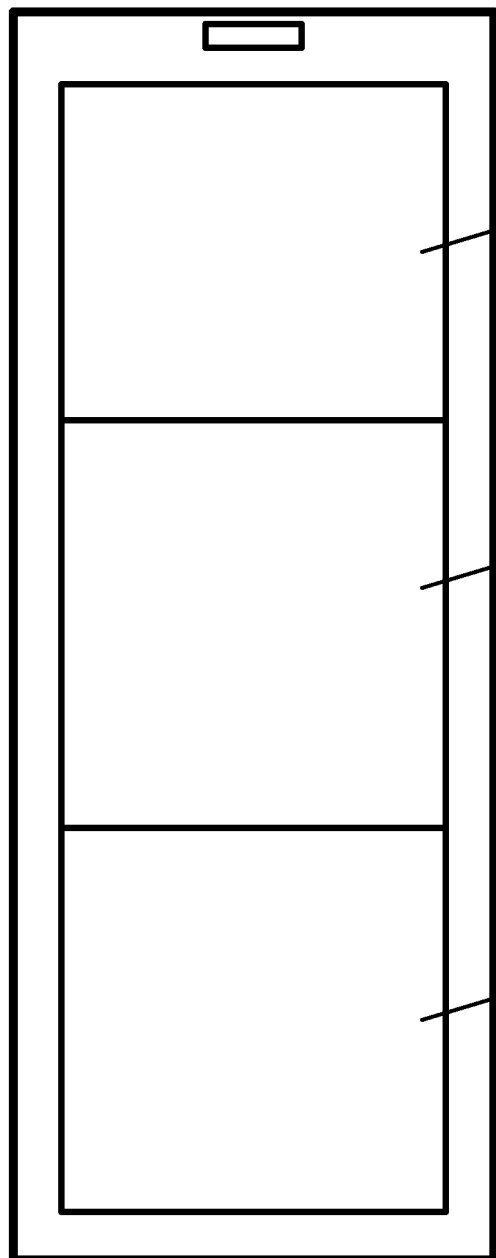
FIGS. 4A and 4B illustrate preferred embodiments for placement of a camera display for the apparatus of the present invention.
Figure 4B:
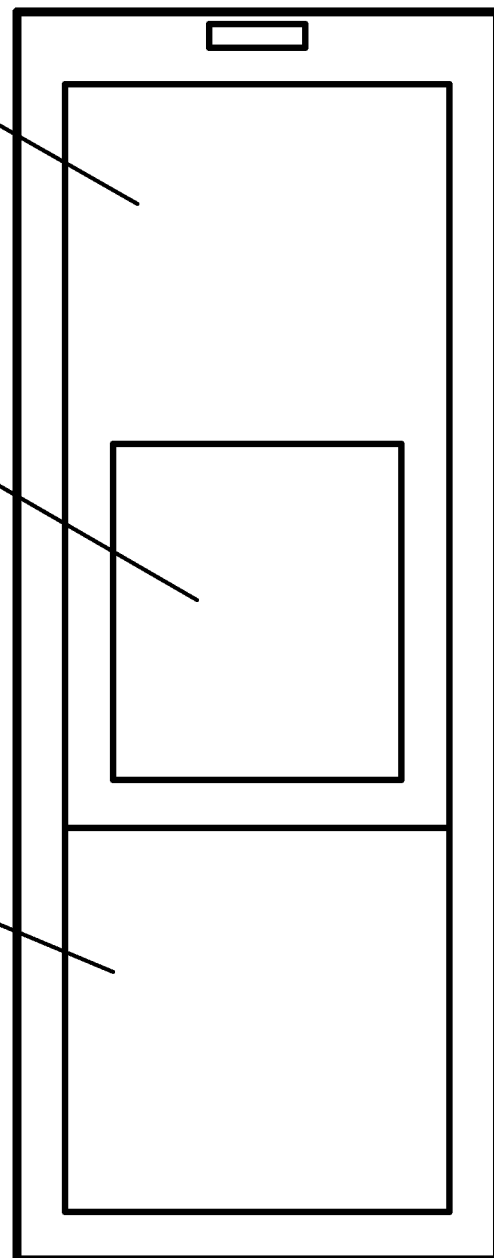

At step 303, the CPU 10 can provide a display of the view, the picture, or the video, of the direction and/or surrounding environment in front of the user to the user via the display device 3 or display area 5. In a preferred embodiment, the view, the picture or the video, can be provided via the display area 5 which can be a separate display device located between the display device 3 which can be used for displaying the respective text, e-mail, game, or picture or video which is the subject of the respective mode of operation, and the keyboard 2, as illustrated in FIG. 4A. In another preferred embodiment, the display area 5 can be integrated into the display device 3 at the lower end portion thereof as illustrated in FIG. 4B.

In a preferred embodiment, if the night vision camera 4B has been activated or turned on, the CPU 10 can provide a night vision, infrared, or thermographic, display of the view, the picture, or the video, of the direction and/or surrounding environment in front of the user to the user via the display device 3 or display area 5. In this manner, a night vision display can be provided to the user if the using the apparatus 100 in the dark or on poorly light environments or areas.

It is important to note that, in another preferred embodiment, the keyboard 2, the display device 3, and the display area 5 can all be provided in or within, or via, a single touchscreen display device.

At step 303, the CPU 10 can also automatically provide the user with an audible and/or visual alert or indication so as to allow the user to avoid colliding with the detected object, article, stationary object, or other individual ("the collision threat"). In a preferred embodiment, the respective audible and/or visual alert or indication can be provided until the collision threat ceases to exist or is no longer present. In addition to the above operations, at step 303, the CPU 10 can also activate a vibrate mode of operation of the apparatus 100 as an additional or supplemental manner in which to provide notification to the user of the detected object, article, stationary object, or other individual for as long as the collision threat exists or is present.

In another preferred embodiment, the apparatus 100 can be utilized in connection with an earpiece or a headset, which can be a wired earpiece of headset which can be connected to the apparatus 100 or a wireless earpiece or headset, such as, but not limited to a Bluetooth earpiece or headset, so that the user can receive any of the herein-described or other audible alerts or indications when the user is in a noisy environment.

At step 304, the CPU 10 can detect when the user de-activates, exits, or otherwise ceases the respective texting mode of operation of the apparatus 100, e-mail mode of operation of the apparatus 100, game or gaming mode of operation of the apparatus 100, picture taking or video recording mode of operation of the apparatus 100, or other mode of operation. Upon detecting the de-activation, the exiting, or the cessation of the respective texting mode of operation of the apparatus 100, e-mail mode of operation of the apparatus 100, game or gaming mode of operation of the apparatus 100, picture taking or video recording mode of operation of the apparatus 100, or other mode of operation, the CPU 10 will de-active the camera system 30, the collision avoidance system 50, and/or the vibrator, if utilized or if activated. Thereafter, the operation of the apparatus will cease at step 305.

In a preferred embodiment, in order to save battery usage, the apparatus 100 can be provided with a switch in order to allow the user to switch or select between modes of operation. In this regard, the user can select to operate the apparatus 100 in a manner described in FIG. 3 in a "Walking Mode", in which mode the apparatus 100 can operate as described above. The user, when not walking, travelling, or moving, can switch the apparatus 100 to a "Stationary Mode" which can allow the user to operate the apparatus 100 without using the camera 4 and the collision avoidance sensors, thereby dispensing with the need for being provided with the view, picture, or video, obtained with the camera 4 and/or dispensing with the need to be provided with collision avoidance alerts or indications. In this regard, the apparatus 100, when in the Walking Mode, can operate as described above with reference to FIG. 3, and when in the Stationary Mode, the apparatus 100 can simply be operated to text, e-mail, play a game, take a picture or record video, or use the apparatus in a videophone or speakerphone mode of operation.

The apparatus 100 and method of the present invention can be utilized in a same, a similar, and/or an analogous, manner with any wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, so as to allow a user or individual to safely engage in texting or reading or writing text messages, retrieving, reading, or writing e-mail messages, playing a game or engaging in gaming activities, taking pictures, recording video, or performing any other operation(s) with any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, while walking, traveling or moving.

In a preferred embodiment, the display area 5, which can display the view, picture, or video, obtained by the camera 4, as well as any visual collision avoidance alerts or indications, is shown as being situated at a location or position in between the keyboard 2 and the display 3 in order to facilitate an easy, an essential, and/or a forced, viewing by the user of the view, picture, or video, and any visual collision avoidance alerts or indications. It is also envisioned that, in another preferred embodiment, the display area 5 can be positioned at any other suitable location, position, or orientation vis-à-vis the keyboard 2 and the display 3.

In another preferred embodiment, whether or not a single touchscreen display is used in connection with the apparatus 100 of the present invention, the apparatus 100 of the present invention can be programmed or equipped so that the location, position, and/or orientation, of each of the keyboard 2, the display 3, and the display area 5, can be programmably located, positioned, or oriented, by the user. In this regard, a user can design and programmably customize the placement and location of each of the keyboard 2, the display device 3 and the display area 5. In another preferred embodiment, the apparatus 100 of the present invention can be programmed or equipped so that the user can programmably change the size and/or shape of each of the keyboard 2, the display device 3, and the display area 5. In this manner, a user of the apparatus 100 of the present invention can customize his or her own user interface.

In another preferred embodiment, the apparatus 100 can be equipped with a suitable speakerphone, microphone, voice recognition software, voice to text conversion software, text to audio conversion software, and/or any other requisite and/or desired hardware and/or software to enable the apparatus 100 to operate in a totally hands-free mode of operation when a user is driving or operating a motor vehicle.

In this embodiment, the apparatus 100 can be designed or programmed to be operated in "Driving" Mode. Once the "Driving" Mode is activated, the apparatus 100, which can be any of the herein-described wireless devices, wireless communication devices, mobile communication devices, cellular telephones, video telephones, videophones, smartphones, personal digital assistants, wireless telephones, satellite telephones, tablets, tablet computers, or mobile computers, or any other wireless, portable, or handheld, devices, can be programmed to convert any and/or all text messages or e-mail messages to audio and "read" the respective text or e-mail messages to the user. In an similar manner, the user can dictate messages or responses to messages, as well as text numbers or addresses or e-mail addresses, and the apparatus 100 can convert the user's dictated speech to text, generate a respective text or e-mail message, and automatically send the respective text message or e-mail message to it's recipient. In a preferred embodiment, the apparatus 100 can also be programmed disable the keyboard or keypad 2 of the apparatus 100 so as to disable any and all manual texting or composing of messages. In a preferred embodiment, any and all in-coming and outgoing text messages or e-mail messages can also be stored in text form.

In the "Driving" mode, the apparatus 100 can also automatically announce an incoming telephone call, answer the telephone call, or initiate a telephone call, and allow the user to engage in the telephone call in a hands-free manner. In the "Driving" mode, the apparatus 100 can also automatically de-activate the keyboard or keypad 2 of the apparatus 100, de-activate the display device 3 of the apparatus 100, provide a voice synthesized reading of a message to the user, or automatically compose and/or generate a test message or an e-mail message from user dictation, such as by using speech or voice recognition technology or any other suitable technology.

In another preferred embodiment, the apparatus 100, which is also equipped with the global positioning system (GPS) 70 and with the navigation and mapping system 80, can also be utilized to provide the user with information regarding and/or directions to a nearest police department(s) or law enforcement office(s), fire department(s), hospital(s), doctor's office(s), dentist's office(s), restaurant(s), gas station(s) or service or repair station(s), hotel(s), points of interest(s), or an individual, relative(s), friend(s), or acquaintance(s), of the user who may live in or near, a geographic location in which the user may be located at a given point in time based on GPS information determined by the apparatus 100 of the present invention. The apparatus 100 can also provide the user with navigation directions or instructions to the respective police department(s) or law enforcement office(s), fire department(s), hospital(s), doctor's office(s), dentist's office(s), restaurant(s), gas station(s) or service or repair station(s), hotel(s), points of interest(s), or location of the relative(s), friend(s), or acquaintance(s). In a preferred embodiment, the user can pre-program the address, telephone number, e-mail address, or other contact information for or regarding any restaurant(s), gas station(s) or service or repair station(s), hotel(s), points of interest(s), or an individual(s), relative(s), friend(s), or acquaintance(s), of the user who may live in or near, a geographic location.

In another preferred embodiment, the apparatus 100 can be programmed and/or equipped to perform the necessary processing routines for determining the position or location, and/or municipal, geographical, jurisdictional, political, or other, subdivision location, of the apparatus 100 at any given time. The apparatus 100 can also be programmed with the address, telephone number, e-mail address, or other contact information for or regarding any police department(s) or law enforcement office(s), fire department(s), hospital(s), doctor's office(s), dentist's office(s), restaurant(s), gas station(s) or service or repair station(s), hotel(s), and/or points of interest(s), in each municipal, geographical, jurisdictional, political, or other, subdivision (hereinafter referred to as "municipal subdivision").

In a preferred embodiment, the apparatus 100 can continuously monitor the position or location of the apparatus 100, and for each municipal subdivision travelled in or through, the apparatus 100 can identify and provide the user with the respective address, telephone number, e-mail address, or other contact information, for or regarding any identified police department(s) or law enforcement office(s), fire department(s), hospital(s), doctor's office(s), dentist's office(s), restaurant(s), gas station(s) or service or repair station(s), hotel(s), and/or points of interest(s), in that municipal subdivision, and can also be programmed to identify and provide the user with the respective address, telephone number, e-mail address, or other contact information for or regarding any identified individual(s), relative(s), friend(s), or acquaintance(s), of the user who may live in or near, that municipal subdivision.

The apparatus 100 can also be pro-programmed with any and all data and/or information for providing the user with navigation instructions to any identified police department(s) or law enforcement office(s), fire department(s), hospital(s), doctor's office(s), dentist's office(s), restaurant(s), gas station(s) or service or repair station(s), hotel(s), and/or points of interest(s), in that municipal subdivision, or with navigation instructions to a location, residence, or place business of the any identified individual(s), relative(s), friend(s), or acquaintance(s), who may live in or near, that municipal subdivision.

Figure 5:
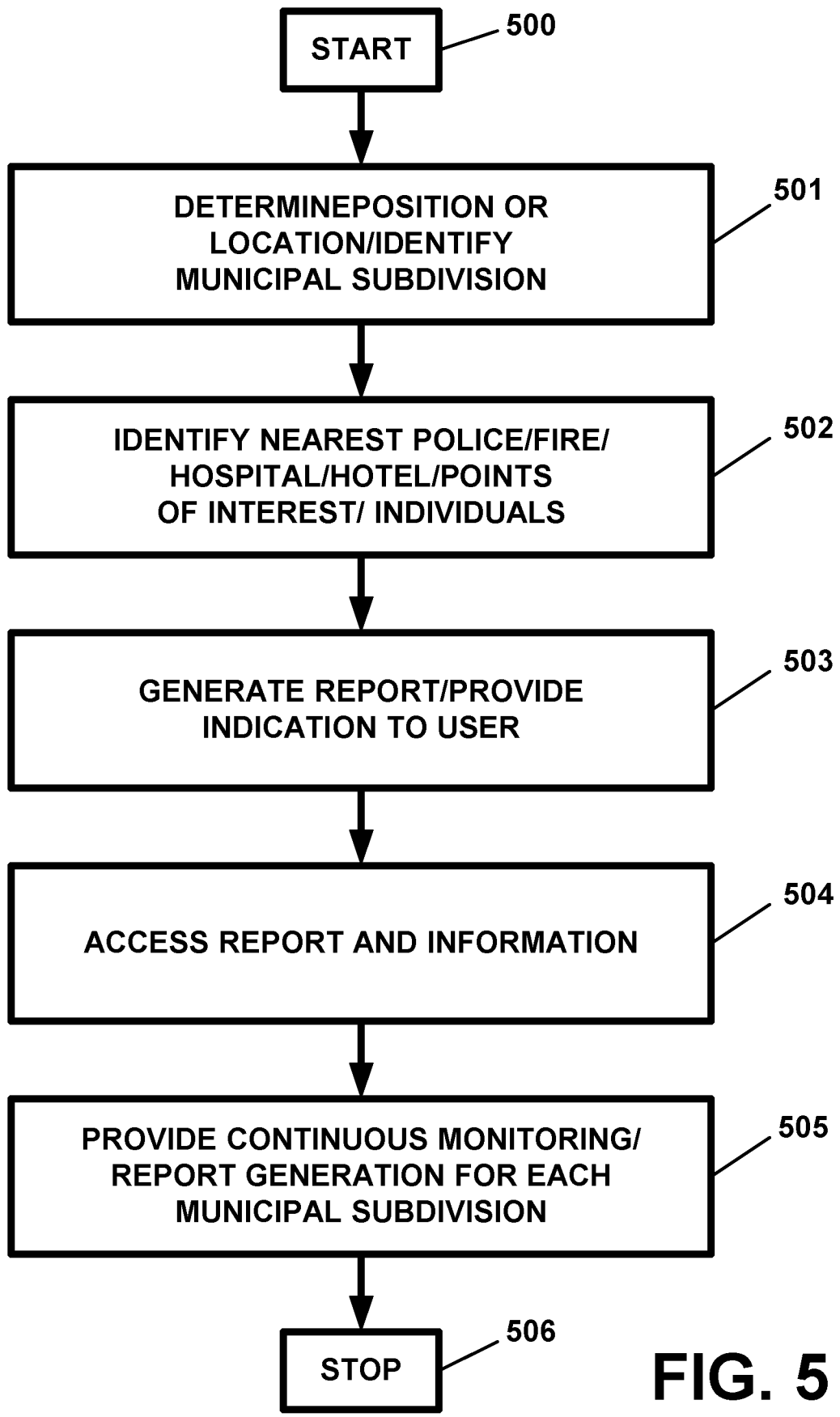
FIG. 5 illustrates another preferred embodiment operation of the apparatus of the present invention, in flow diagram form.

FIG. 5 illustrates another preferred embodiment method for utilizing the apparatus 100 of the present invention, in flow diagram form. With reference to FIG. 5, the operation of the apparatus 100 commences at step 500. At step 500, the operation of the apparatus 100 commences when the apparatus 100 is either turned on, or when the mode of operation of the method of FIG. 5 is activated or turned on by the user. At step 501, the apparatus 100 can determine the position or location of the apparatus 100 using the apparatus global positioning system 70. At step 501, the apparatus 100 can also identify the municipal subdivision within which the apparatus 100 is determined to be located. At step 502, the apparatus 100 can also identify any and all nearest police department(s) or law enforcement office(s), fire department(s), hospital(s), doctor's office(s), dentist's office(s), restaurant(s), gas station(s) or service or repair station(s), hotel(s), points of interest(s), or any individual, relative(s), friend(s), or acquaintance(s), of the user, in the identified municipal subdivision.

At step 503, the apparatus 100 can generate a report which can include the name, address, telephone number, text message address or number, or e-mail address, of and for any and/or all of the identified nearest police department(s) or law enforcement office(s), fire department(s), hospital(s), doctor's office(s), dentist's office(s), restaurant(s), gas station(s) or service or repair station(s), hotel(s), points of interest(s), or any individual, relative(s), friend(s), or acquaintance(s), of the user, in the identified municipal subdivision, which were identified at step 502. Once the report is generated the apparatus can also, at step 503, provide the user with a visual indication on the display device 3 or display area 5 or can provide the user with an audible indication via the speaker 7. At step 504, the user can access the report and any and/or all of the information contained therein via the apparatus 100.

Thereafter, the apparatus 100, at step 505, can continuously monitor and determine the position or location of the apparatus 100 and can generate a new report each time it is determined that the apparatus 100 has moved into a new municipal subdivision.

The operation will cease at apparatus 100 will thereafter cease at step 506 when the user deactivates the apparatus 100, turns the power off, or has otherwise deactivated this mode of operation.

In the above-described manner, in a preferred embodiment, the apparatus 100 and method of the present invention can be used to provide continuous monitoring of the position or location of the apparatus 100 and can provide continuous information to user regarding the municipal subdivision in which the user and the apparatus 100 are located as well as provide any and/or all of the herein-described information, including the name, address, telephone number, text message address or number, or e-mail address, of and for any or all of the identified nearest police department(s) or law enforcement office(s), fire department(s), hospital(s), doctor's office(s), dentist's office(s), restaurant(s), gas station(s) or service or repair station(s), hotel(s), points of interest(s), or any individual, relative(s), friend(s), or acquaintance(s), of the user, in the identified municipal subdivision.

In another preferred embodiment, the apparatus 100, equipped with the afore-mentioned global positioning system (GPS) 70, can also be programmed to send newly composed messages or previously prepared or pre-stored emergency messages which can be sent to report emergency situations to local police departments, fire departments, emergency responders, parents, relatives, friend (police, fire, parents). In a preferred embodiment, the message can include the GPS position or location data or information regarding the location of the apparatus 100 at the time the emergency message is transmitted from the apparatus 100. In another preferred embodiment, the apparatus 100 can also be programmed to send pre-stored messages reporting emergency situations, which messages can be retrieved and sent by using a programmed speed dial key or speed dialing keys.

Figure 6:
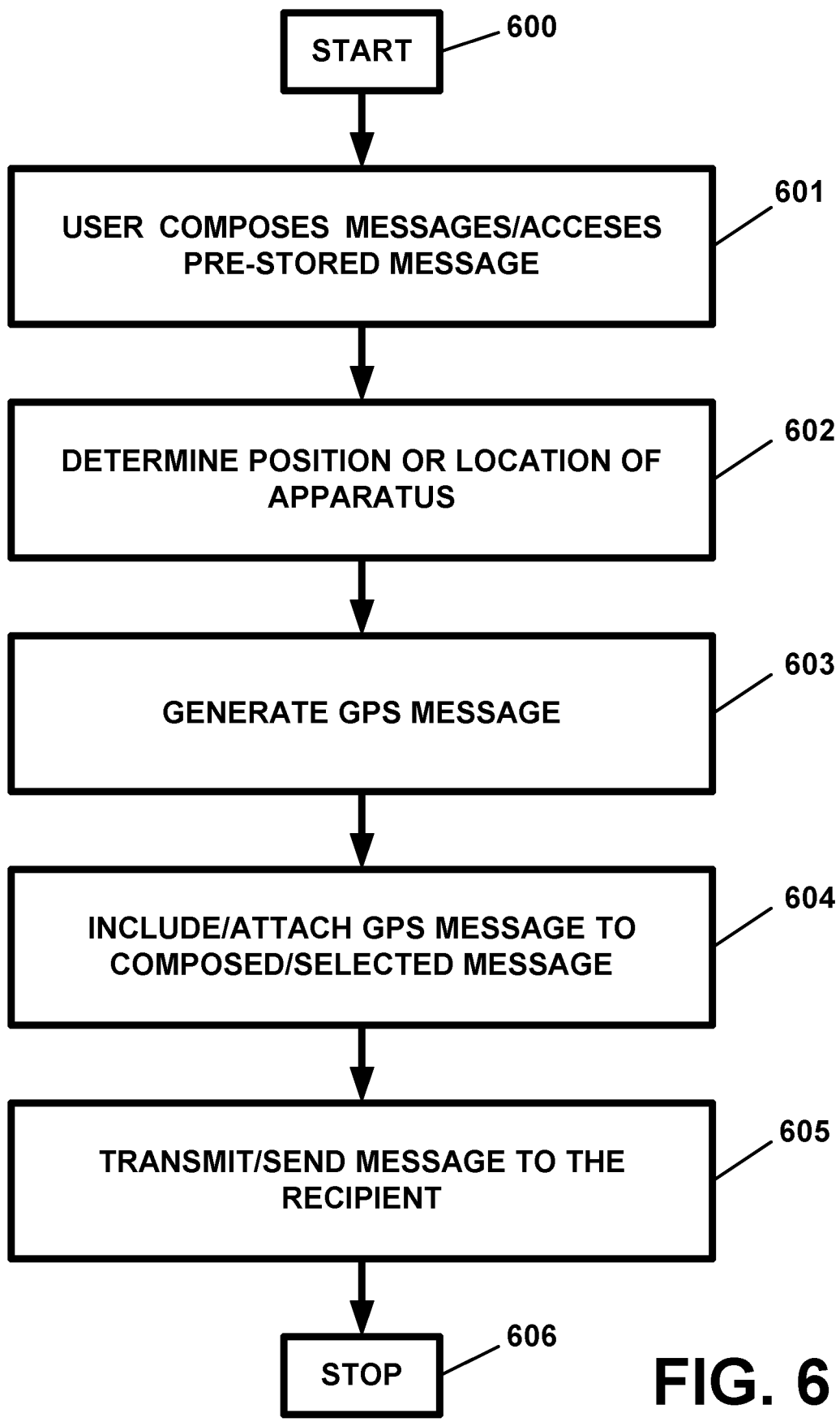
FIG. 6 illustrates yet another preferred embodiment operation of the apparatus of the present invention, in flow diagram form.

FIG. 6 illustrates another preferred embodiment method for utilizing the apparatus 100 of the present invention, in flow diagram form. With reference to FIG. 6, the operation of the apparatus 100 commences at step 600. At step 601, the user can either compose a message or can access a pre-stored message. At step 601, the user can compose a text message or e-mail message with the apparatus 100. In another embodiment, at step 601, the user can, while in a situation when the user cannot compose a message, such as in an emergency situation, when the user is injured, or at or involved at the scene of a robbery or at any other crime scene, access any one of a number of pre-stored message(s), describing the situation, from the apparatus 100. In a preferred embodiment, any pre-stored messages can be retrieved from a pre-stored message menu, by using a programmed speed dial key or speed dialing keys, or can be called up by voice command using voice recognition or voice command software.

The pre-stored messages can have pre-determined recipients and their respective texting address or number or e-mail address. In another preferred embodiment, the apparatus 100 can be equipped to, and can, automatically identify, in a manner described herein with reference to the embodiment of FIG. 5, the recipient of the message if the recipient is a police department or law enforcement office in the municipal subdivision where the apparatus 100 is determined to be located at the time.

At step 602, the apparatus 100 can determine the position or location of the apparatus 100 by utilizing the global positioning system (GPS) 70 of the apparatus 100. At step 603, the apparatus 100 will generate a GPS message containing the GPS position or location of the apparatus 100. At step 604, the apparatus will either include the GPS message in the body of the message composed or selected by the user at step 601, or attach the GPS message to the message composed or selected by the user at step 601. At step 605, the apparatus 100 will transmit or send the message to the recipient. Thereafter, the operation of the apparatus 100 will cease at step 606.

In another preferred embodiment, the apparatus 100 and method of the present invention can be utilized to report on the whereabouts of a user. As and for an example, that user can be a child. In such an embodiment, the user or child can, using the global positioning (GPS) system 70 of the apparatus 100, ascertain and store his or her position or location, which can be the position or location of the apparatus 100 within a municipal subdivision or other geographical location. For example, a child, who might be travelling away from home, can store his or her current location within a municipal subdivision or other geographical location in the apparatus 100. If the child should thereafter travel, whether expectedly or unexpectedly, beyond a pre-determined radius (hereinafter "the safe area") from that stored position or location, the apparatus 100 can be programmed to generate and transmit an alert message alerting a parent or other authorized individual that the child has left that pre-determined position or location, the time the child left the safe area, and the child's current position or location.

The alert message can also contain any picture(s) of any view(s) obtained by the camera 4 or camera 4B which might show the area or environment in which the apparatus 100 is located. In this manner, if a child should leave the predetermined safe area for any reason, the apparatus 100 can automatically detect same and notify the child's parent or another authorized individual by sending any suitable text message or e-mail message to a communication device utilized by or associated with the parent or other authorized individual. It is important to note that, although described herein as being utilized to allow a parent or authorized individual to monitor the whereabouts of a child, the apparatus 100 can also be utilized by any authorized individuals to monitor the whereabouts of any other individual(s) of any and/or all ages.

The apparatus 100 can also be programmed to identify a police department or law enforcement office, in an manner described herein as be capable of being performed by the apparatus 100 and can transmit the alert message to a communication device utilized by or associated with the police department or law enforcement office.

The apparatus 100 can, thereafter, also compute the position or location of the child user's apparatus 100 and generate and transmit messages to the parent and/or to the police department or law enforcement office at predetermined intervals and on an on-going basis in order to track or monitor the movement of the child user's apparatus 100. The messages can also contain any picture(s), video, or video clips, of any view(s) obtained by the camera 4 or camera 4B which might show the area or environment in which the apparatus 100 is located and/or the path of travel of the apparatus 100 and the child.

Figure 7A:
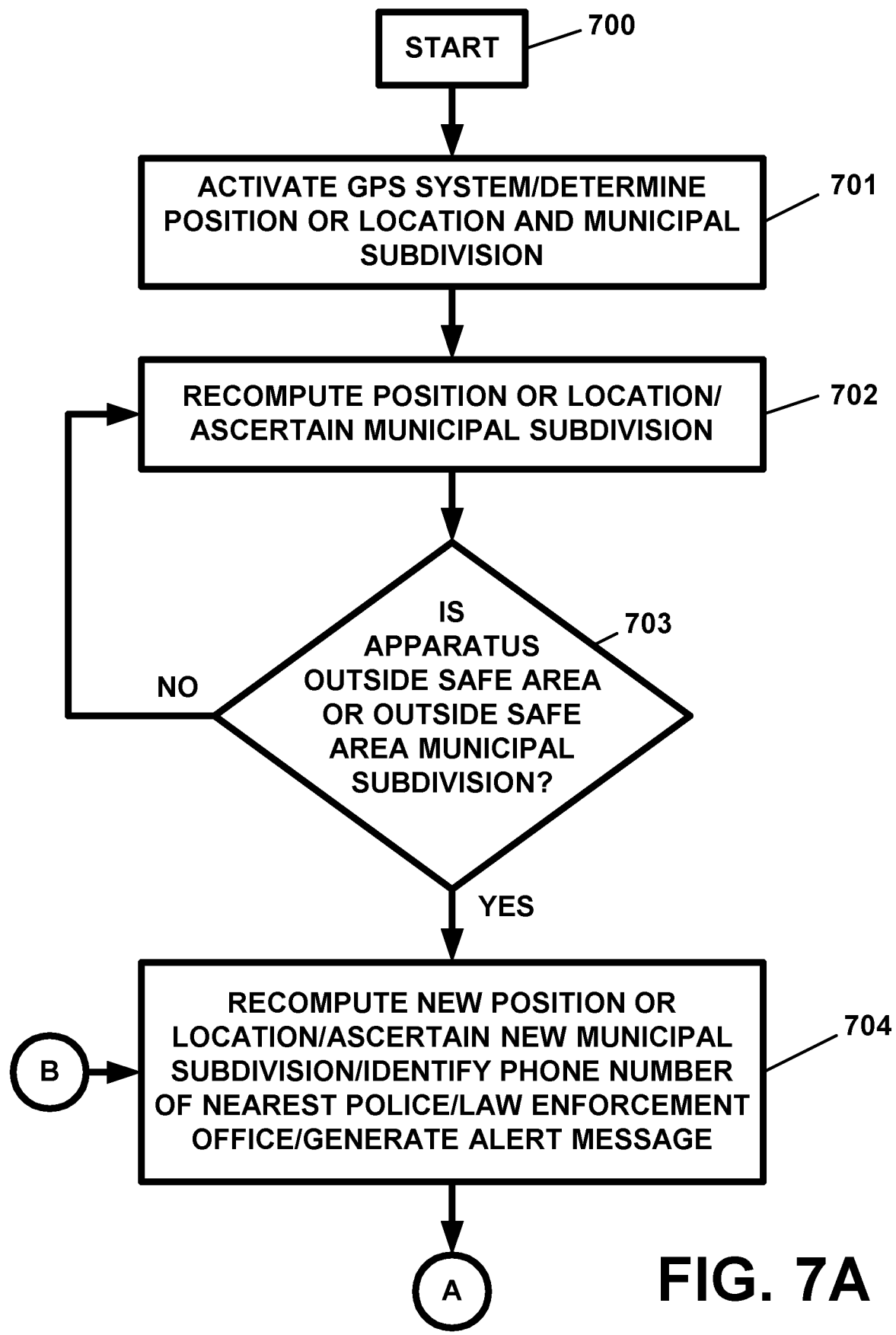
FIGS. 7A and 7B illustrate still another preferred embodiment operation of the apparatus of the present invention, in flow diagram form.
Figure 7B:
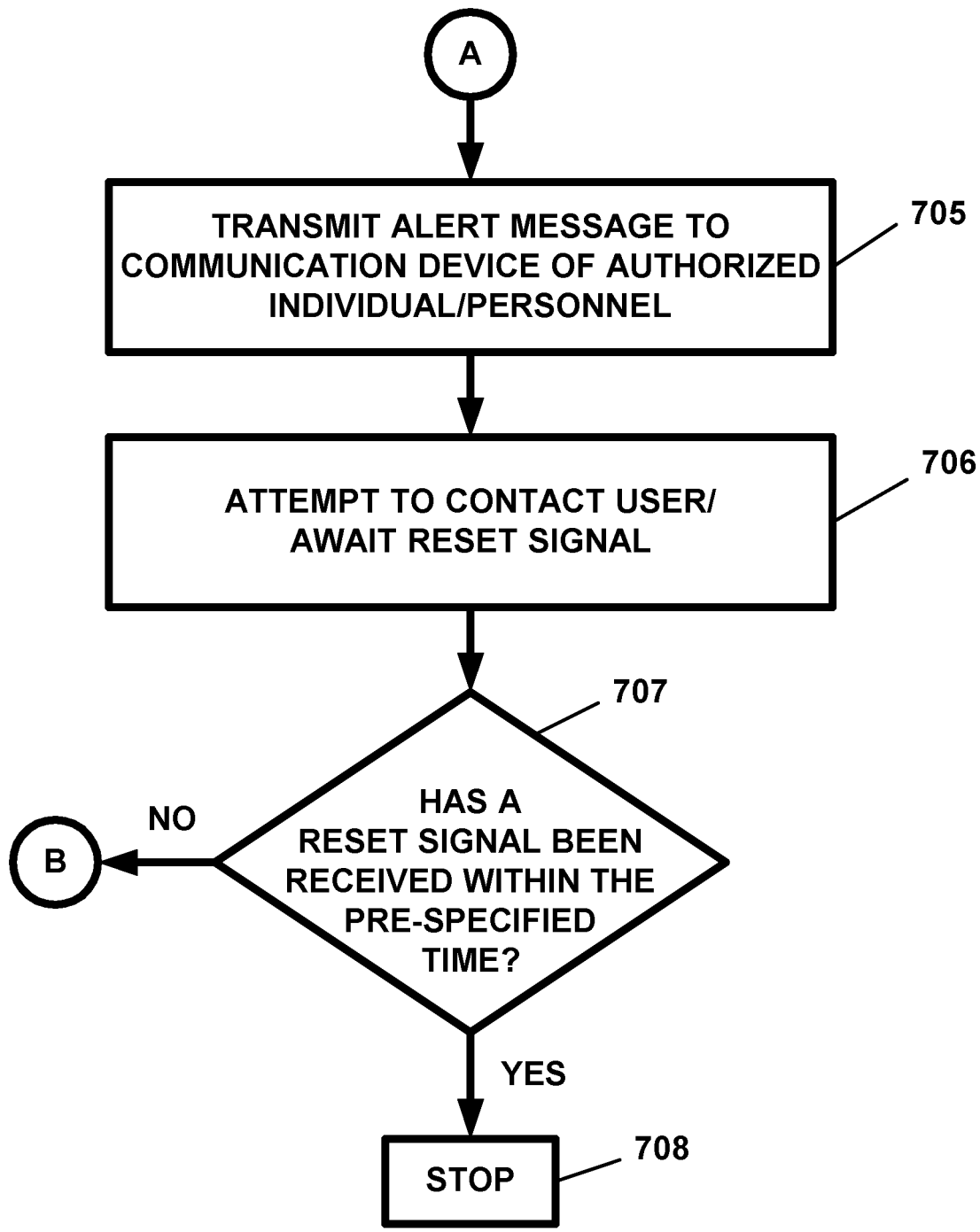

FIGS. 7A and 7B illustrates another preferred embodiment method for utilizing the apparatus 100 of the present invention, in flow diagram form. Although the preferred embodiment of FIGS. 7A and 7B is described as being utilized to allow a parent or authorized individual to monitor the whereabouts of a child, it is important to note and it is important that it be understood that the preferred embodiment of FIGS. 7A and 7B can also be utilized by any authorized individuals to monitor the whereabouts of any other individual(s) of any and/or all ages. It is also important to note that, in a preferred embodiment, the 100 can and will be equipped with any and/or all of the data and/or information needed or desired to perform all of the functions and functionality, as well as any and/or software and/or hardware needed for performing any and all of the data and/or information processing routines, described herein as being performed by the apparatus 100 in the preferred embodiment of FIGS. 7A and 7B.

With reference to FIGS. 7A and 7B, the operation of the apparatus 100 commences at step 700. At step 701, the child user can activate the global positioning system (GPS) system 70 of the apparatus 100 so as to determine his or her position or location and the municipal subdivision in which he or she is located. At step 701, the apparatus 100 will determine the position or location and the municipal subdivision in which the apparatus 100 and the child user are located.

In a preferred embodiment, a pre-determined radius of travel from the position or location can be pre-selected or programmed into the apparatus 100. The pre-determined radius of travel will define and represent a "safe area radius of travel" by the child user and any travel beyond or outside of this "safe area radius of travel" will result in the apparatus 100 providing notice and the herein-described information to the parent or other authorized individual. In another preferred embodiment, the "safe area" can also be selected to be the identified municipal subdivision (hereinafter "the safe area municipal subdivision") determine or ascertained by the apparatus 100.

At step 702, the apparatus 100 will periodically re-compute the GPS position or the location of the apparatus 100 and will ascertain the municipal subdivision in which the apparatus 100 and the child user are located, it being assumed that the child user maintains possession of the apparatus 100 at all times.

At step 703, the apparatus 100 will determine if the apparatus 100 and the child user have travelled outside of the safe area radius of travel or outside of the safe area municipal subdivision. If at step 703, it is determined that the apparatus 100 and the child user have not travelled outside of the safe area radius of travel or outside of the safe area municipal subdivision, then the operation of the apparatus will proceed to step 702 and the apparatus 100, after a pre-determined or programmed time interval, which can be selected to be any time interval, will re-compute the GPS position or the location of the apparatus 100 and the child user and will ascertain the municipal subdivision in which the apparatus 100 and the child user are located. Thereafter, the operation of the apparatus 100 will proceed to step 703 and the above described process will be repeated.

If, at step 703, it is determined that the apparatus 100 and the child user have travelled outside of the safe area radius of travel or have travelled outside of the safe area municipal subdivision, then the operation of the apparatus 100 will proceed to step 704 and the apparatus 100 can determine the new or current position or location of the apparatus 100 and identify the new or current municipal subdivision within which that new or current position or location is located, identify the telephone number to the police department or law enforcement office nearest to the current location, and can generate an alert message which contains information to notify or alert the parent or other authorized individual that at the child user and the apparatus 100 has travelled beyond the safe area radius of travel or travelled outside the safe area municipal subdivision, the time the child user and the apparatus 100 was determined to have travelled beyond the safe area radius of travel or to have travelled outside the safe area municipal subdivision, the current time and current position or location of the child user and the apparatus 100, and/or a picture, video, or video clip, obtained with the camera 4 or camera 4B of any view in the direction in which child user was or is currently walking or otherwise currently moving or located as well as a current view of the child user's current surroundings or surrounding environment.

The alert message can be generated as a text message, as an SMS or other message, as an e-mail message, or as any other message which can be transmitted in a network environment. Any picture(s), or video, or video clip(s), sent with the alert message can be sent in the alert message, as part of the alert message, as an attachment to the alert message, or in any other suitable manner.

At step 705, the apparatus 100 can transmit the alert message to a communication device, wireless communication device, wireless telephone, mobile telephone, cellular telephone, landline telephone, videophone, video telephone, personal digital assistant, computer, personal computer, tablet, tablet computer, e-mail server, or any other communication device or any other device described herein as being used as an apparatus 100, which is associated with or used by the parent or other authorized individual. At step 705, the apparatus 100 can also transmit the alert message to a communication device, wireless communication device, wireless telephone, mobile telephone, cellular telephone, landline telephone, videophone, video telephone, personal digital assistant, computer, personal computer, tablet, tablet computer, e-mail server, or any other communication device or any other device described herein as being used as an apparatus 100, which is associated with or used by the identified local police department or law enforcement office of the identified current municipal subdivision.

In this manner, if a child should leave the safe area radius of travel or the safe area municipal subdivision for any reason, the apparatus 100 can automatically detect same and notify the child's parent or another authorized individual by sending any suitable alert message to a communication device utilized by or associated with the parent or other authorized individual. The alert message can also be sent to the local police department or law enforcement office.

Thereafter, at step 706, the parent or other authorized individual can attempt to call, send a text or e-mail message to, or otherwise contact, the child user via the apparatus 100 or via any other communication device. At step 706, the apparatus 100 will await a system reset signal sent by the parent or other authorized individual which reset signal will signify that the parent or other authorized individual has contacted to the child user and confirmed that the child user is safe and sound. At step 706, the apparatus 100 will await a system reset signal for a pre-determined or pre-specified period, which in a preferred embodiment, can be five (5) minutes or any other pre-specified time period.

At step 707, the apparatus 100 will determine if a reset signal was received within the pre-specified time period for receiving same. If, at step 707, it is determined that a reset signal was not received within the pre-specified time period, then the operation of the apparatus 100 will proceed to step 704 and the operation of the apparatus 100 will be repeated at steps 704 through 707. The above process will be repeated until it is determined that a reset signal is received with the pre-specified time period, thereby signifying that the child user is safe and sound. If, however, at step 707, it is determined that a reset signal was received and that the pre-specified time period had not elapsed, then the operation of the apparatus 100 will cease at step 708.

The apparatus 100 can be provided with any of the data and/or information needed or desired for performing any and/or all of the herein-described processing routines for determining the GPS position or location of the apparatus 100, for identifying the municipal subdivision where the apparatus 100 is located, for identifying the appropriate police department or law enforcement office, for identifying the parent or other authorized individual, for generating and transmitting the herein-described alert message(s) to the appropriate parent, authorized individual, and/or police department or law enforcement office, and for performing any and/or all of the processing routines described herein as being performed by the apparatus and method of the present invention.

Although described herein as being utilized to allow a parent or authorized individual to monitor the whereabouts of a child user of the apparatus 100, it is important to note that the apparatus 100 can also be utilized by any authorized individuals to monitor the whereabouts of any other individual(s) of any and/or all ages. In another preferred embodiment, the video or video clip(s), which can be sent along with the alert message, can be of any duration or length of time.

In another preferred embodiment, the embodiment of FIGS. 7A and 7B can be performed in conjunction with, or in connection with, a central processing computer or a server computer which can be accessed by the parent or authorized individual and/or by police department or law enforcement personnel to receive and retrieve any of the herein-described alert messages, pictures, video, or video clips, reset signals, and/or any messages sent by and between the child user, the parent of authorized individual, or police or law enforcement personnel. In this manner, the central processing computer or server computer can serve as a centralized computer system and/or as a hub of operations and/or as a centralized record keeping repository for monitoring and tracking the location and/or movement of children and other individuals via the apparatus 100 of the present invention.

In another preferred embodiment, the central processing computer or server computer can receive a respective alert message, store same in a file or record for the child user, generate and transmit an notification message to a communication device used by or associated with the parent or other authorized individual and/or police or law enforcement personnel, and, upon request by the parent or other authorized individual and/or police or law enforcement personnel, transmit the respective alert message(s) and any other attendant or accompanying information, picture(s), video, or video clip(s), to the communication device used by or associated with the parent or other authorized individual and/or police or law enforcement personnel.

The central processing computer or server computer can also receive, store, and relay, any text or e-mail messages which may be transmitted to, from, or between, any of the child users, or any other users of the apparatus 100, and any parents or any other authorized individuals, or the police or law enforcement personnel, as well as receive, store, and relay, any reset signals sent from a parent or other authorized individual.

In another preferred embodiment, the apparatus 100 can automatically record and store video or a video clip for any pre-determined period of time. The video or video clip can be stored in a memory device of and/or at the apparatus 100 and/or the video or video clip can be automatically transmitted to a central processing computer or server computer for retrieval by any authorized person. In a preferred embodiment, for example, the apparatus 100 can record and continuously store the recorded video or video clip obtained by the camera 4 or night vision camera 4B at the apparatus 100 or in a memory device utilized in or with the apparatus 100. For example, video or video clip recorded for the most recent hour, or any other pre-determined time period can be recorded and stored.

In a preferred embodiment, the stored video or video clip can also be transmitted to, and stored at, a central processing computer or server computer from which it can be retrieved by any authorized individual using a personal computer, a personal communication device, a tablet computer, a laptop or notebook computer, a personal digital assistant, a cellular telephone, a wireless telephone, or any other communication device. In this manner, for example, a parent can ascertain, from the video or the video clip, a last know whereabouts of a child or any other person in or under their care when they may have been texting or reading or writing text messages, retrieving, reading, or writing e-mail messages, playing a game or engaging in gaming activities, taking pictures, recording video, or performing any other operation(s) with any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices, while walking, traveling or moving.

Figure 8:
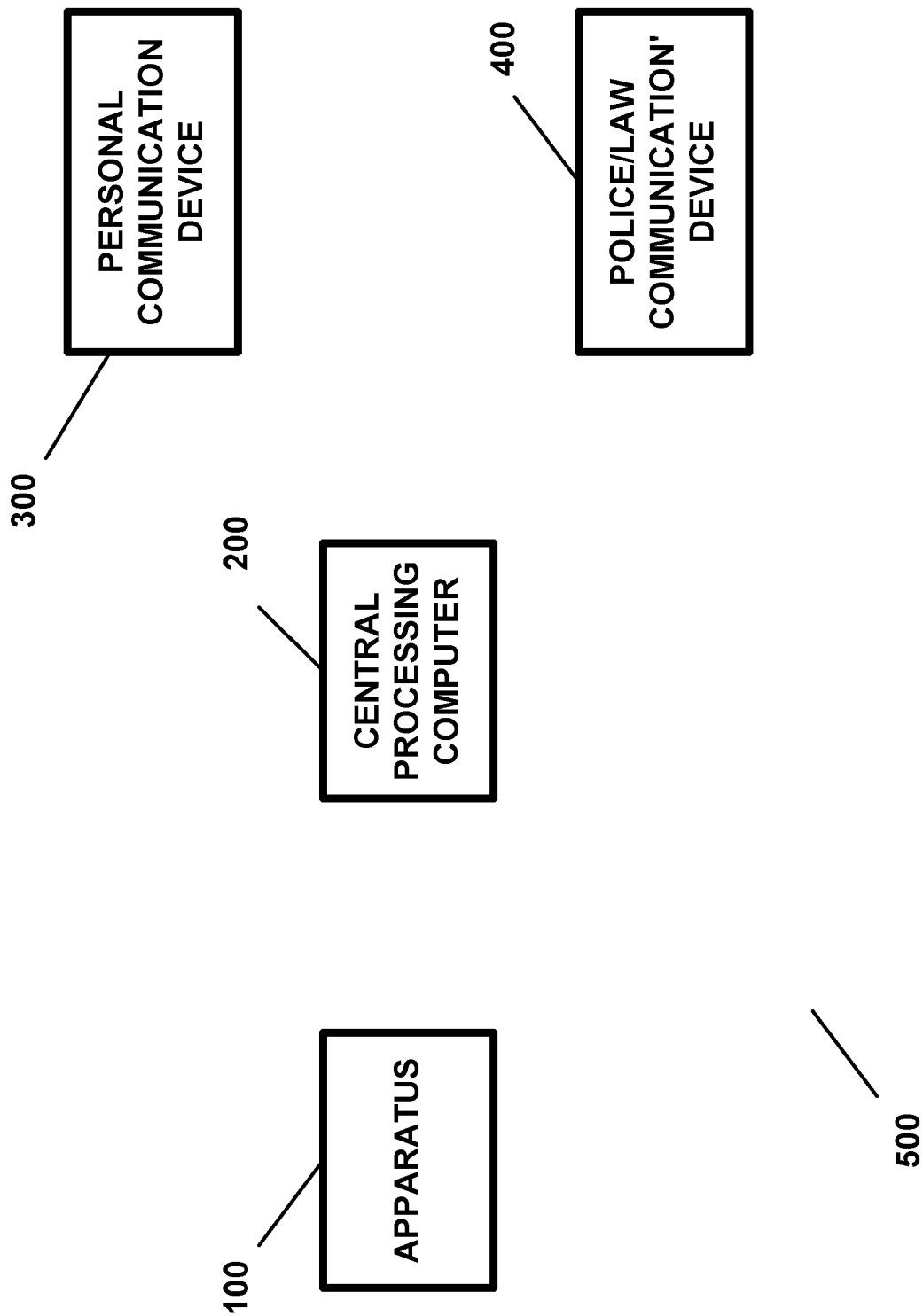
FIG. 8 illustrates a preferred embodiment of another apparatus of the present invention, in block diagram form.

FIG. 8 illustrates a preferred embodiment of another apparatus of the present invention, which is denoted generally by the reference numeral 500, in block diagram form. With reference to FIG. 8, the apparatus 500 includes the apparatus 100, a central processing computer or server computer 200 (hereinafter "central processing computer 200" which can control an operation of the apparatus 500, a personal communication device 300, and a police or law enforcement communication device 400. Any number of apparatuses 100, any number of central processing computers 200, any number of personal communication devices 300, and any number of police or law enforcement communication devices 400, can be utilized in or with the apparatus 500.

Any of the personal communication devices 200 or any of the police or law enforcement communication devices 400 can be any one or more of any of the communication devices, wireless communication devices, wireless telephones, mobile telephones, cellular telephones, landline telephones, videophones, video telephones, personal digital assistants, computers, personal computers, tablets, tablet computers, digital music players or devices, handheld or portable music player devices or music playing devices, portable gaming devices, handheld gaming devices, handheld video game consoles, portable game consoles, or any other wireless, portable, or handheld, devices, or e-mail servers, or any other communication devices or any other devices described herein as being used as an apparatus 100.

Any of the apparatuses 100, central processing computers 200, personal communication devices 300, and police or law enforcement communication devices 400 can communicate with any other apparatus 100, central processing computer 200, personal communication device 300 which can be used by or associated with any parent, authorized individual, or any other person or entity authorized to use (hereinafter "authorized person or entity") the apparatus 500 with regards to a given apparatus 100, and police or law enforcement communication device 400 in a bi-directional manner and via any communication network, wireless communication network, satellite communication network, the Internet and/or the World Wide Web, and/or any other communication network or any combination or same. In a preferred embodiment, the apparatus 500 is utilized via, on, or over, the Internet and/or the World Wide Web.

Figure 9:
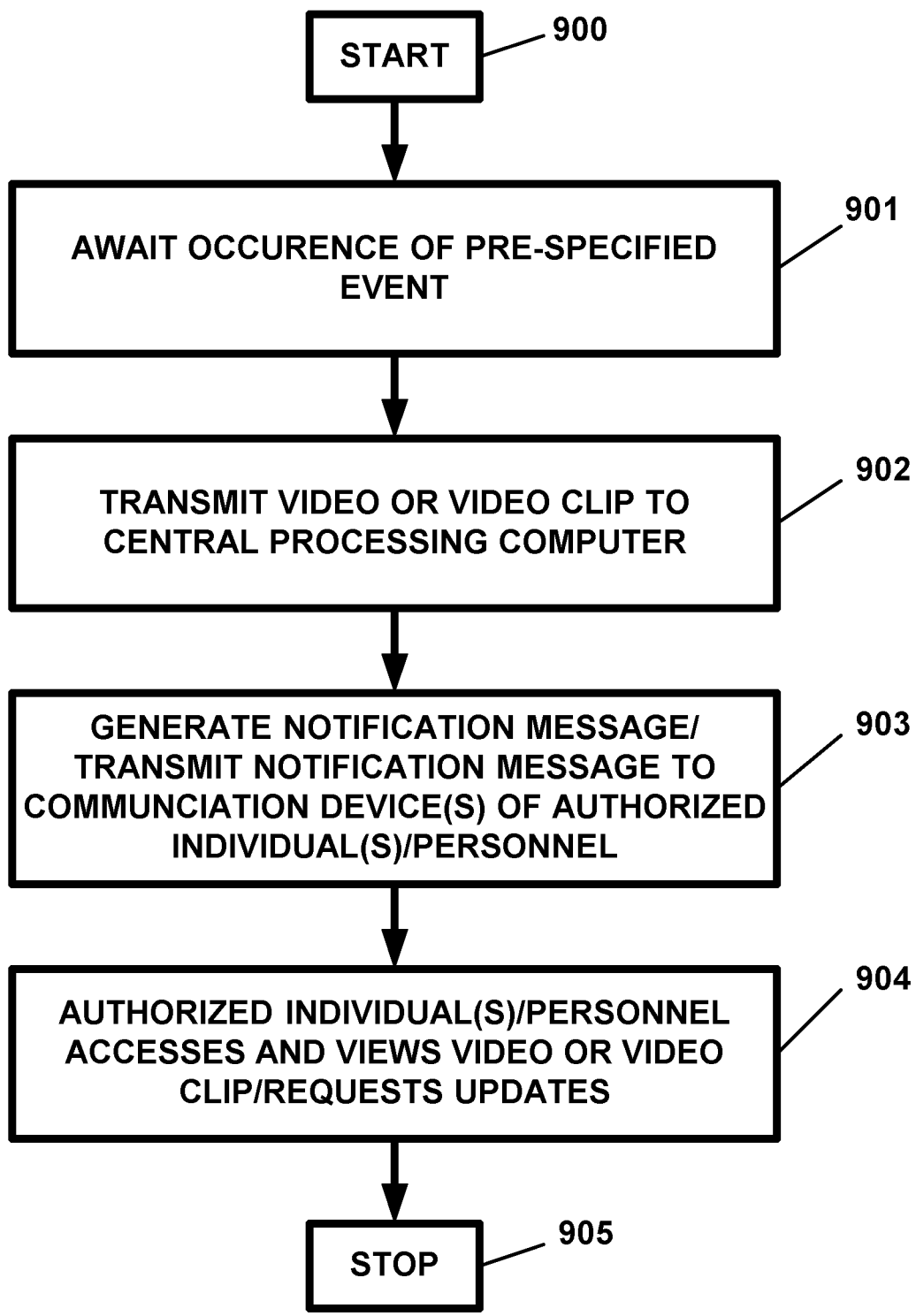
FIG. 9 illustrates another preferred embodiment operation of the apparatus of FIG. 8, in flow diagram form.

FIG. 9 illustrates another preferred embodiment operation of the apparatus 500 of FIG. 8, in flow diagram form. With reference to FIG. 9, the operation of the apparatus 500 commences at step 900. In a preferred embodiment, the apparatus 100 can be programmed to record video or a video clip with the camera 4 and/or the camera 4B for any pre-determined period of time. In a preferred embodiment, the pre-determined time period can be one hour. Although one hour is selected in a preferred embodiment, it is to be understood that the video or video clip can be for any other selected time period or duration.

In a preferred embodiment, the apparatus 100 can be programmed to transmit the recorded and stored video or video clip to the central processing computer 200 upon the occurrence of any pre-specified event. The pre-specified event can be or can include any one or more of a pre-selected time of day, a day of the week, an occurrence of the apparatus 100 user leaving a safe are radius of travel, a safe area municipal subdivision, a activation of an emergency call or a "911" call, a call made to a police department or law enforcement office, a fire department, or a hospital, or any other pre-specified event or occurrence.

The event or occurrence can also be the receipt of a signal requesting the video or video clip which can be transmitted to the apparatus 100 from the central processing computer 200, a personal communication device 200, or a police or law enforcement communication device 300, or the event or occurrence can be the result of an activation by the user of the apparatus 100 to transmit the video or video clip to the central processing computer 200, the personal communication device 200, or the police or law enforcement communication device.

At step 901, the apparatus 100 will await the occurrence of the specified event. Once the event has occurred, the apparatus 100 will, at step 902, transmit the video or video clip to the central processing computer 200 where it can be received and stored and from which any authorized person or entity or police or law enforcement personnel can retrieve same via an appropriate communication device 300 or 400.

At step 903, the central processing computer 200 can generate a notification message containing information regarding the received video or video clip, identify any authorized person or entity who should be notified, identify the police or law enforcement personnel, if any, who should be notified, and can transmit the notification message to the respective personal communication device 300 of or associated with the authorized person or entity, and/or can transmit the notification message to the police or law enforcement communication device of or associated with the identified police or law enforcement personnel. In a preferred embodiment, the notification message can contain a link or a hyperlink to the video or video clip.

At step 904, the authorized person or the authorized person for the authorized entity can access and view the video or video clip. At step 904, the authorized person or the authorized person for the authorized entity can request updated video or video clips at any desired intervals. These requests can thereafter be transmitted from the respective communication device 300 or 400 directly to the apparatus 100 or to the apparatus 100 via the central processing computer 200. In a preferred embodiment, steps 901 through 904 can be repeated for as long a request exists for updated video or video clips. Thereafter, the operation of the apparatus 500 will cease at step 905.

In another preferred embodiment, the apparatus 100 can, at step 902, transmit the video or video clip to the personal communication device 300 of the authorized person or entity and/or to the police or law enforcement communication device 400, in addition to transmitting the video or video clip to the central processing computer 200.

In another preferred embodiment, the authorized person or entity or the police or law enforcement personnel can access the apparatus 100 directly via a respective communication device 300 or 400 and request and receive a transmission of the video or video clip from the apparatus 100. In the above manner, video or video clips, which might provide information regarding the safety and/or whereabouts of any user of the apparatus 100 can be readily obtained, stored, archived, and retrieved by any authorized person or entity or by police or law enforcement personnel.

In any and/or all of the embodiments described herein, the apparatus 100 can and designed, equipped, and/or programmed, so that the operation of the apparatus 100 in any of the embodiments described herein can be voice-activated, automatically activated, and/or manually activated, by a user.

In any and/or all of the embodiments described herein, the camera 4 or 4B can be activated when the apparatus 100 is moving as well as when the apparatus 100 is stationary or not moving. In this regard, in addition to the apparatus 100 providing, via the display device 3 or the display area 5, a view, picture, or video, obtained by the camera 4 or 4B in a direction of the travel or a direction of movement of the apparatus 100, the apparatus 100 can also provide, via the display device 3 or the display area 5, a view, picture, or video, obtained by or with the camera 4 or 4B by the apparatus 100 or from the apparatus 100.

In any and/or all of the embodiments described herein, any of the pictures, video, or video clips, obtained, recorded, stored, transmitted, or provided, by the apparatus 100 of the present invention or the apparatus 500 of the present invention can also include audio recordings or audio information as well. In any and/or all of the embodiments described herein, the microphone 8 of the apparatus 100 can record audio information which audio information can be included with any picture, video, or video clip, obtained, recorded, stored, transmitted, or provided by the apparatus 100 of the present invention or the apparatus 500 of the present invention.

In any and/or all of the embodiments described herein, the apparatus 100 can be programmed and equipped to time stamp and/or date stamp any pictures, video, or video clips, obtained, recorded, stored, transmitted, or provided, by the apparatus 100 of the present invention or by the apparatus 500 of the present invention.

In any and/or all of the embodiments described herein, the apparatus 100, and/or any it its herein-described components, devices, equipment, or the central processing unit (CPU) 10, can be programmed to determine the position or location of the apparatus 100 at the time and location when and where a picture, video, or video clip, is being obtained or recorded, determine or identify the municipal subdivision where the picture, video, or video clip is being obtained or recorded, and place or insert a location stamp in, on, or into or onto ("location stamp"), any pictures, video, or video clips, obtained, recorded, stored, transmitted, or provided, by the apparatus 100 of the present invention or by the apparatus 500 of the present invention.

In another preferred embodiment, the apparatus of the present invention, and/or the apparatus of any of the preferred or other embodiments described herein, or otherwise, can be equipped with sensors or detectors for sensing or detecting any one or more of a number of unsafe conditions and/or a dangers at or near, or in a vicinity of, the apparatus of the present invention. In this regard, in another preferred embodiment, the apparatus 100 of FIG. 1, which can be any type or kind of cellular telephone, smartphone, personal digital assistant, wireless communication device, mobile communication device, video telephone, videophone, wireless telephone, satellite telephone, tablet, tablet computer, mobile computer, portable gaming device, handheld gaming device, handheld video game console, portable game console, or any other wireless, portable, or handheld, device, can also include and/or can also be equipped with, a thermometer, a heat sensor, a sensor for detecting or for sensing intense heat, a sensor for detecting or for sensing an unsafe temperature, a smoke detector, a fire detector, a natural gas detector or sensor, a propane detector or sensor, a methane detector or sensor, a Freon detector or sensor, a chlorine detector or sensor, a carbon monoxide (CO) detector or sensor, or a detector or sensor for detecting or sensing any other gas or harmful substance or any other substance(s) or material(s), and/or a detector or sensor for detecting or sensing any other condition which can or might justify providing a suitable alert message or notification message, or report, to a parent, a relative, a friend, a local police department, a local or other fire department, and/or an emergency responder.

Figure 10:
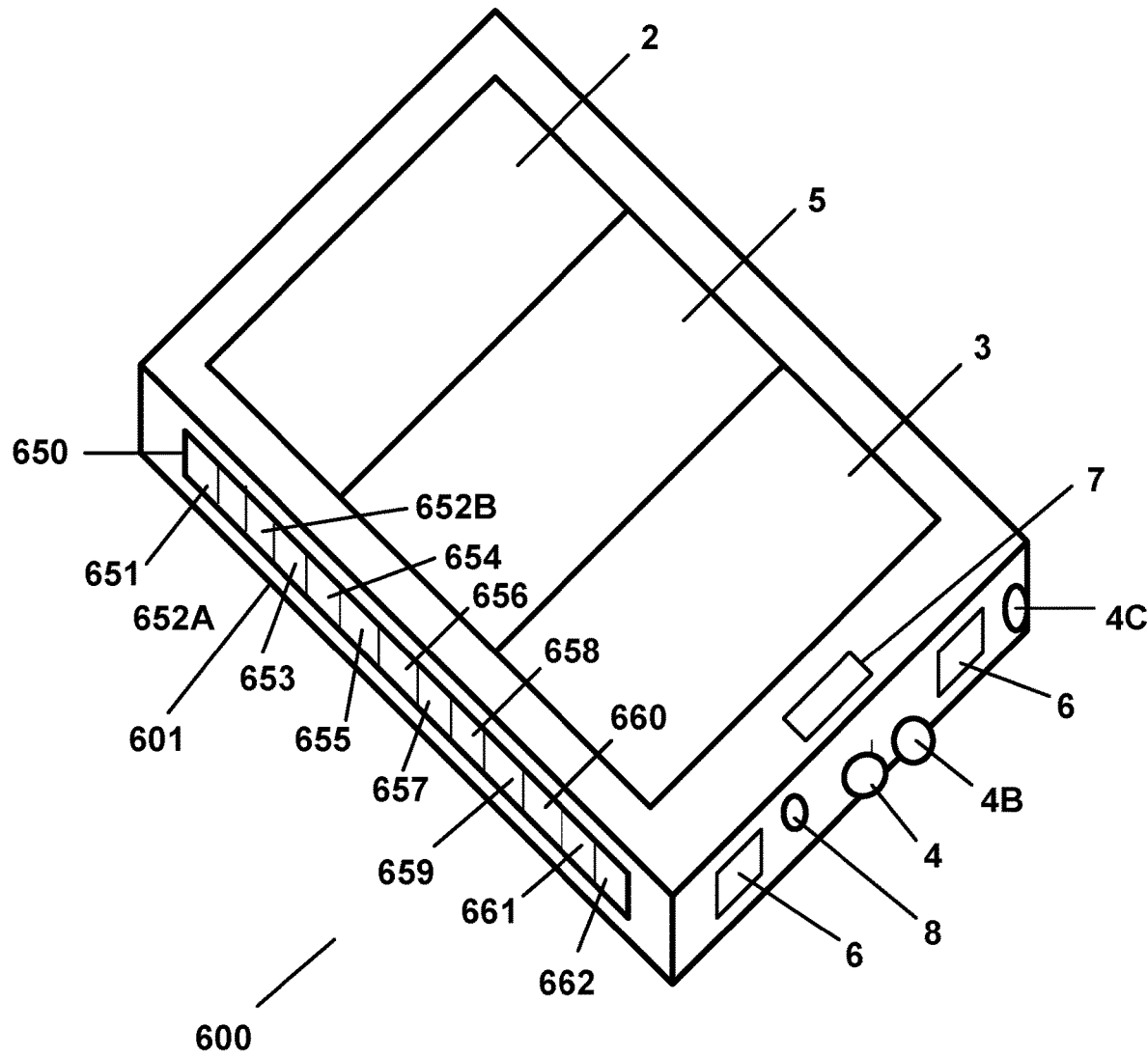
FIG. 10 illustrates another preferred embodiment of a wireless, portable, or handheld, device in or with which the apparatus of the present invention can be utilized.

FIG. 10 illustrates another preferred embodiment of a wireless, portable, or handheld, device in or with which the apparatus of the present invention can be utilized. With reference to FIG. 10, the apparatus is denoted by the reference number 600. In a preferred embodiment, the apparatus 600 of FIG. 10, can, for example, be any wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, which has the respective features, components, functionality and functions of each respective device which are know as of the date of the filing of this application.

As and for an example, the apparatus 600 of FIG. 10 can be described as being a cellular telephone, smartphone, or personal digital assistant. Although described in an exemplary embodiment as being a cellular telephone, smartphone, or personal digital assistant, the apparatus 600 of FIG. 10 can also be any of the herein-described wireless devices, wireless communication devices, mobile communication devices, cellular telephones, video telephones, videophones, smartphones, personal digital assistants, wireless telephones, satellite telephones, tablets, tablet computers, mobile computers, portable gaming devices, handheld gaming devices, handheld video game consoles, portable game consoles, or any other wireless, portable, or handheld, devices.

With reference to FIG. 10, the apparatus 600 includes a case 601, a keyboard or keypad 2 (hereinafter "keyboard 2") which can be any type or kind of keyboard, keypad, or a touchscreen keyboard, and a display device 3 for displaying text, a picture, and/or video. The display device 3 can be any type or kind of display, a display device, or a touchscreen display. Although the apparatus 600 in FIG. 10 is illustrated as having a keyboard 2 separate and apart form the display device 3, in another preferred embodiment, the keyboard 2 and display device 3 can be designed to be integrated into a single touchscreen display such as those used in certain smartphones and tablet computers which are known as of the application filing date of this application.

With reference once again to FIG. 10, the apparatus 600, can also include a camera 4 or any number of cameras 4. In the preferred embodiment, the camera 4 can be any suitable camera or video recording device which can be utilized to obtain and provide a picture or video of a view in a direction in front of the apparatus 600 and/or a view of the surrounding environment. In another preferred embodiment, the apparatus 600 can also include a night vision device or system 4A (not shown) which can be, or which can include, a night vision camera 4B or cameras 4B which can be a night vision camera, an infrared camera, or a thermographic camera which can provide a picture or video of a view in a direction in front of the apparatus 600 and/or a view of the surrounding environment during nighttime or in darkness.

The night vision device or system 4A can also include a light measuring device 4C, such as, or example, an electric eye device or any other device for detecting darkness which can be utilized to automatically switch on a respective night vision camera, infrared camera, or thermographic camera. In another preferred embodiment, the apparatus 600 can be equipped so that the night vision device or system 4A and/or the associated night vision camera 4B can be manually activated or turned on, or the apparatus 600 can be programmed to automatically activate the night vision device or system 4A and/or the associated night vision camera 4B. In the preferred embodiment, a night vision camera 4B is also utilized along with camera 4 as shown in FIG. 10.

In a preferred embodiment, the camera 4 can also be a wide angle camera or video recording device, such as those utilized in connection with automobile or vehicle back-up or rearview camera systems. In a preferred embodiment, the camera 4 is located or positioned on a top side or front facing side of the apparatus 600 as shown in FIG. 10. Although, the camera 4 is shown as being located or positioned on a top side or front facing side of the apparatus 600 in FIG. 10, and at the approximate center of said side, it is important to note that the camera 4 may be located or positioned on any side of the apparatus 600 and can be located or positioned at any location or orientation. In another preferred embodiment, any number of cameras 4 can be utilized with the apparatus 600 and they can be located or positioned anywhere and/or at or on any side or location on the apparatus 600. In a preferred embodiment, the camera 4 obtains and provides a view, picture, or video, of the direction and surrounding environment in which an individual is walking while either, texting, retrieving, reading, or writing, an e-mail message, playing a game, or otherwise operating the apparatus 600.

In a preferred embodiment, the view, picture, or video, obtained by and provided by the camera 4 can be viewed on the display device 3 or in a display window or display area 5 provided or dedicated therein or thereon for same. With reference once again to FIG. 10, the apparatus 600 also includes at least one collision avoidance sensor(s) 6. In the preferred embodiment of FIG. 10, the apparatus 600 can also include one or more collision avoidance sensors 6 located or positioned on the top side or front-facing side of the apparatus 600. It is important to note, however, that the any number of collision avoidance sensors 6 can be utilized in connection with the apparatus 600 and they can be located or positioned anywhere and/or at or on any side or location on the apparatus 600. In another preferred embodiment, any number of collision avoidance sensors 6 can be utilized with the apparatus 600 and they can be located or positioned anywhere on the apparatus 600.

In a preferred embodiment, the collision avoidance sensor(s) 6 can detect objects, structures, or individuals, in the vicinity of the apparatus 600 and can generate an alert or other indication which can be conveyed via the apparatus 600 to alert or inform an individual using the apparatus 600 of the detected object, structure, or individual so as to allow the individual using the apparatus 600 to avoid a collision with same. In a preferred embodiment, the collision avoidance sensor(s) 6 can be of the same type or kind as collision avoidance sensors utilized in automobile or vehicle parking assist systems.

With reference once again to FIG. 10, the apparatus 600 can also include a collision avoidance speaker 7 for providing an audible collision avoidance alert or audio information regarding a detected object, structure, or individual, to the individual using the apparatus 600. In a preferred embodiment, a visual alert, signal, of message, can also be provided on the display 3 or the display screen or display area 5.

In a preferred embodiment, the collision avoidance speaker 7 can also provide an audible alert or an audible message upon the detection of any danger, and/or the detection of any dangerous, hazardous, or unsafe, condition(s), which is/are detected by the apparatus 600 and/or by the herein-described sensor/detector system 650 of the apparatus 600. In this regard, the collision avoidance speaker 7 can serve multiple roles in alerting an individual, or in alerting any other persons or individuals in the vicinity of the apparatus 600, regarding various danger, and/or any dangerous, hazardous, or unsafe, conditions. In this regard, the collision avoidance speaker 7 is by no means limited to just providing audible alerts regarding a potential collision.

With reference once again to FIG. 10, the apparatus 600 can also include a microphone 8 for recording audio information.

With reference once again to FIG. 10, the apparatus 600 also includes the aforementioned sensor/detector system 650. In a preferred embodiment, the sensor detector system 650 can include, or can include any one or more of, or any combination of, a thermometer 651, a heat sensor 652A, a sensor for detecting or for sensing intense heat 652B, a sensor for detecting or for sensing an unsafe temperature 653, a smoke detector 654, a fire detector 655, a natural gas detector or sensor 656, a propane detector or sensor 657, a methane detector or sensor 658, a Freon detector or sensor 659, a chlorine detector or sensor 660, a carbon monoxide (CO) detector or sensor 661, or a detector or sensor for detecting or sensing any other gas or harmful substance or any other substance(s) or material(s) 662, and/or a detector or sensor for detecting or sensing any other condition which can or might justify providing a suitable alert message or notification message, or report, to a parent, a relative, a friend, a local police department, a local or other fire department, and/or an emergency responder.

Figure 11:
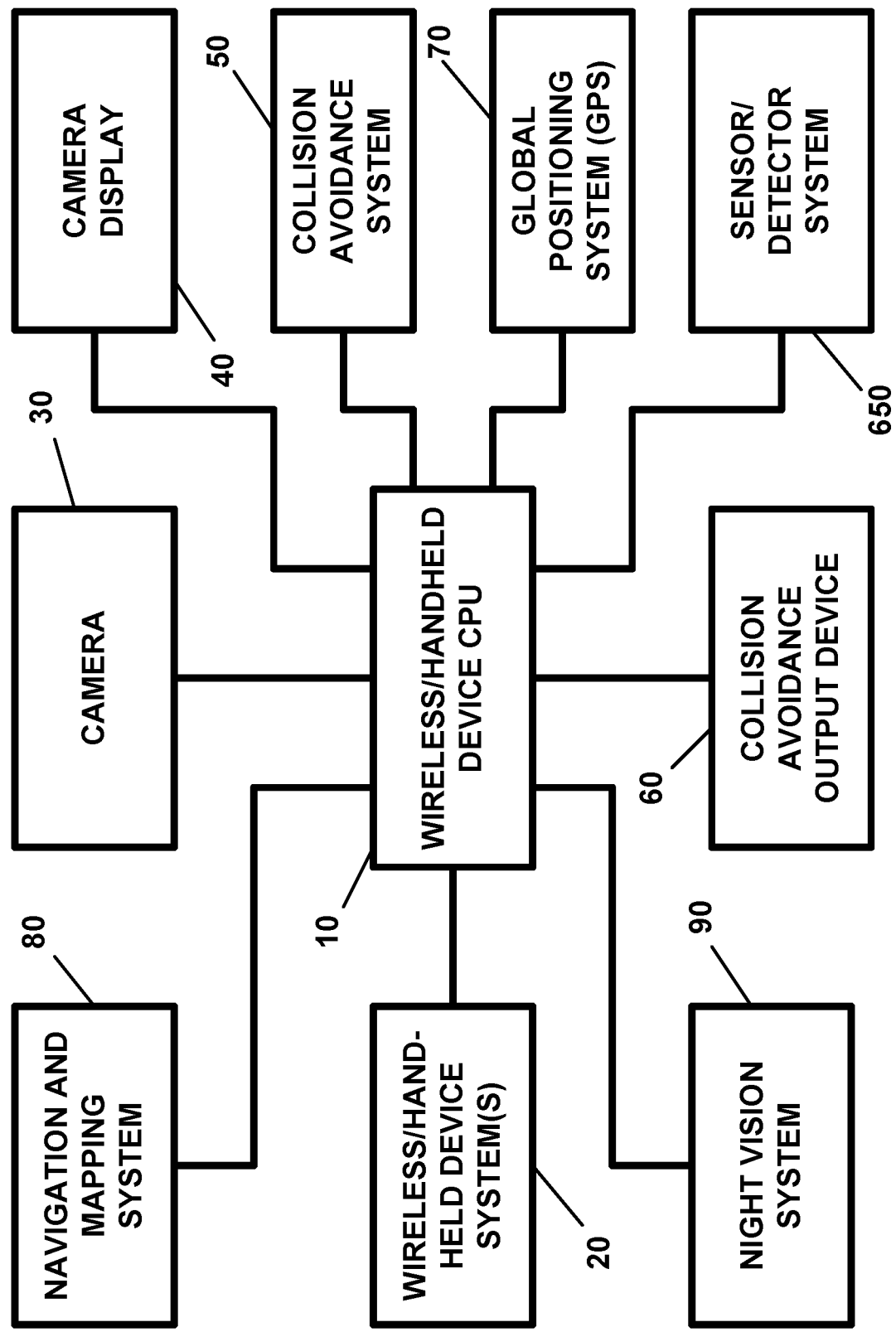
FIG. 11 illustrates a preferred embodiment of the apparatus of the present invention, in block diagram form.

FIG. 11 illustrates a preferred embodiment of the apparatus 600 of FIG. 10, in block diagram form. With reference to FIG. 11, the apparatus 600 includes a central processing unit (CPU) 10 which can be the controller of control device for the apparatus 600 and which can control the operation of the apparatus 600. The apparatus 600 also includes all of the wireless, portable, or handheld, device systems 20, which is connected to the CPU 10 and which includes any and/or all of the necessary or desired hardware, software, and/or firmware, of the apparatus 600, whether the apparatus 600 is a wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device.

The wireless, portable, or handheld, device systems 20 can include any of the necessary and/or desired equipment, hardware, software, or firmware, which is typically found, or which can typically be found, in a respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device, in order to facilitate any of the functions or functionality which are found in or provided by these respective devices as of the time of the filing of this application as well as any other equipment, hardware, software, or firmware, which are known to those having ordinary skill in the art of these respective devices as of the time of the filing of this application. The wireless, portable, or handheld, device systems 20 can include any of the necessary and/or desired equipment, hardware, software, or firmware, for performing any other functionality described herein as being provided by the apparatus 600 of the present invention.

The CPU 10 controls the operation of the apparatus 600. In a preferred embodiment, the CPU 10 can be a microprocessor, a microcomputer, a mini-computer, or any other suitable processor, processing device, or control device.

With reference once again to FIG. 11, the apparatus 600 can also include a camera system 30 which includes the camera 4 or cameras 4. The camera system 30, in a preferred embodiment, is connected to or linked with or to the CPU 10. The camera system 30 can be one and the same camera system for taking pictures with the apparatus 600, if so equipped, or the camera system 30 can be dedicated for providing the view, picture, or video, of the direction and surrounding environment in which an individual is walking while either, texting, retrieving, reading, or writing, an e-mail message, playing a game, or otherwise operating the apparatus 600.

The apparatus 600 can also include a camera display system 40 which can include the display device 3 and/or the display area 5, for providing the view, picture, or video, obtained by the camera 4. In a preferred embodiment, the camera system 30 can be implemented using devices and/or technology which can be the same as, similar to, or analogous to, those camera systems utilized in automobile or vehicle back-up or rearview camera systems which provide a vehicle operator or occupant with a view of the direction in which the vehicle is traveling backwards or backing-up or with a view in the rear of the vehicle or a rearview. The camera display system 40, in a preferred embodiment, is connected to or linked with or to the CPU 10.

The apparatus 600 can also include a collision avoidance system 50 which can include the collision avoidance sensor(s) 6 and/or the collision avoidance speaker 7. The collision avoidance system 50 can also include and/or utilize the display device 3 and/or the display area 5 in order to provide a visual indication to a user of the apparatus 600. The collision avoidance system 50, in a preferred embodiment, is connected to or linked with or to the CPU 10.

The apparatus 600 can also includes a collision avoidance output device 60 which can also include or utilize the collision avoidance speaker 7 and which can also utilize the display device 3 and/or the display area 5 in order to provide a visual indication to a user of the apparatus 600. The collision avoidance output device 60, in a preferred embodiment, is connected to or linked with or to the CPU 10.

The apparatus 600 can also include a global positioning system (GPS) 70 for determining the position of location of the apparatus 600. The apparatus 600 can also include a navigation and mapping system 80 for providing navigation information, directions, instructions, and/or for providing digitized maps or digital maps to a user of the apparatus 600.

The apparatus 600 of the present invention can also include a night vision system 90 which can be, or which can include, the night vision device or system 4, and the night vision camera or cameras 4B. The night vision camera or cameras 4B can be any night vision camera, an infrared camera, or a thermographic camera which can provide a picture or video of a view in a direction in front of the apparatus and/or a view of the surrounding environment during nighttime or in darkness. The night vision system 90 can also include the above-mentioned light measuring device, such as, or example, an electric eye device or any other device for detecting darkness which can be utilized to automatically switch on a respective night vision camera, infrared camera, or thermographic camera.

The apparatus 600 of the present invention can also be equipped so that the night vision system 90 and/or the associated night vision camera 4B can be manually activated or turned on, or the apparatus 600 can be programmed to automatically activate the night vision system 90 and/or the associated night vision camera 4B.

It is important to note that the wireless, portable, or handheld, device systems 20 can also include any and all hardware, equipment, software, and any programs or applications, for providing any and/or all of the functions and/or functionality of the respective wireless device, wireless communication device, mobile communication device, cellular telephone, video telephone, videophone, smartphone, personal digital assistant, wireless telephone, satellite telephone, tablet, tablet computer, mobile computer, digital music player or device, handheld or portable music player device or music playing device, portable gaming device, handheld gaming device, handheld video game console, portable game console, or any other wireless, portable, or handheld, device, or any other device. In addition, the wireless, portable, or handheld, device systems 20 can also include a global positioning device or system, a navigation and mapping system, and a night vision system.

The apparatus 600 and method of the present invention can be utilized, in a preferred embodiment, to allow a user of the apparatus 600 to view the direction in which he or she is walking, moving, or traveling, and/or its surrounding environment, while texting or reading or writing text messages, while retrieving, reading, composing, and/or sending, e-mails, while taking pictures, while recording information, while playing games, and/or when otherwise using the present invention, or the apparatus or device equipped with the present invention, while walking, moving, or traveling.

In a preferred embodiment, the apparatus 600 can detect when a user activates or commences a texting mode of operation of the apparatus 600, an e-mail mode of operation of the apparatus 600, a game or gaming mode of operation of the apparatus 600, a picture taking or video recording mode of operation of the apparatus 600, a videophone or speakerphone mode of operation, or any other mode of operation which might require that the user take his or her eyes off of his or her direction of walking, movement, or travel.

The apparatus 600 or the CPU 10 can automatically detect the respective mode of operation, and in response thereto, can automatically activate the camera system 30 and provide a display of the view, the picture, or the video, of the direction and/or surrounding environment in front of the user to the user via the display device 3 or display area 5. The apparatus 600 or the CPU 10 can also activate the collision avoidance system 50 which can detect objects, articles, stationary objects, or other individuals in the user's path of travel and can automatically provide the user with an audible and/or visual alert or indication so as to allow the user to avoid colliding with the detected object, article, stationary object, or other individual. The apparatus 600 or the CPU 10 can also activate a vibrate mode of operation of the apparatus 600 as an additional or supplemental manner in which to provide notification to the user of the detected object, article, stationary object, or other individual.

The apparatus 600 or the CPU 10, upon detecting the end of the respective texting mode of operation of the apparatus 600, the e-mail mode of operation of the apparatus 600, the game or gaming mode of operation of the apparatus 600, the picture taking or video recording mode of operation of the apparatus 600, a videophone or speakerphone mode of operation, or other mode of operation, can automatically deactivate the camera system 30 and the collision avoidance system 50.

With reference once again to FIG. 11, the apparatus 600 also includes a sensor/detector system 650. In a preferred embodiment, the sensor/detector system 650 can include, or can include any one or more of, or any combination of, a thermometer the apparatus 600 also includes a sensor/detector system 650. In a preferred embodiment, the sensor detector system 650 can include any one of more of, or any combination of, a thermometer 651, a heat sensor 652A, a sensor for detecting or for sensing intense heat 652B, a sensor for detecting or for sensing an unsafe temperature 653, a smoke detector 654, a fire detector 655, a natural gas detector or sensor 656, a propane detector or sensor 657, a methane detector or sensor 658, a Freon detector or sensor 659, a chlorine detector or sensor 660, a carbon monoxide (CO) detector or sensor 661, or a detector or sensor for detecting or sensing any other gas or harmful substance or any other substance(s) or material(s) 662, and/or a detector or sensor for detecting or sensing any other condition which can or might justify providing a suitable alert message or notification message, or report, to communication device or computer of or associated with a parent, a relative, a friend, a local police department, a local or other fire department, and/or an emergency responder.

With reference once again to FIG. 11, as with each of all of the devices or systems 20, 30, 40, 50, 60, 70, 80, and/or 90 of the apparatus 100 of FIGS. 1 and 2, in a preferred embodiment, the sensor/detector system 650 of the apparatus 600 of FIGS. 10 and 11, can also be connected to, or linked with, the CPU 10. In this regard, in a preferred embodiment, the sensor/detector system 650 and/or any of the thermometer 651, the heat sensor 652A, the sensor for detecting or for sensing intense heat 652B, the sensor for detecting or for sensing an unsafe temperature 653, the smoke detector 654, the fire detector 655, the natural gas detector or sensor 656, the propane detector or sensor 657, the methane detector or sensor 658, the Freon detector or sensor 659, the chlorine detector or sensor 660, the carbon monoxide (CO) detector or sensor 661, or the detector or sensor for detecting or sensing any other gas or harmful substance or any other substance(s) or material(s) 662, and/or the detector or sensor for detecting or sensing any other condition which can or might justify providing a suitable alert message or notification message, or report, to a parent, a relative, a friend, a local police department, a local or other fire department, and/or an emergency responder, included or contained in the sensor/detector system 650 can also be connected to, or linked with, the CPU 10.

In another preferred embodiment, the apparatus 600 can be utilized to sense or detect an unsafe or dangerous condition with and utilizing the sensor/detector system 650 and/or with or using any one or more of the thermometer 651, the heat sensor 652A, the sensor for detecting or for sensing intense heat 652B, the sensor for detecting or for sensing an unsafe temperature 653, the smoke detector 654, the fire detector 655, the natural gas detector or sensor 656, the propane detector or sensor 657, the methane detector or sensor 658, the Freon detector or sensor 659, the chlorine detector or sensor 660, the carbon monoxide (CO) detector or sensor 661, or the detector or sensor for detecting or sensing any other gas or harmful substance or any other substance(s) or material(s) 662, and/or the detector or sensor for detecting or sensing any other condition, can generate suitable alert message or notification message, or report, containing information regarding the sensed or detected condition, and can transmit the alert message or notification message, or the report, to a communication device or computer of or associated with a parent, a relative, a friend, a local police department, a local or other fire department, and/or an emergency responder. In this regard, in a preferred embodiment, the alert message or notification message, or the report, can be transmitted by and/or from the apparatus 600 to the central processing computer 200, to a respective personal communication device(s) 300 of the parent, relative, or friend, or other authorized individual, and/or to a police or law enforcement communication device(s) 400.

In a preferred embodiment, the apparatus 600, upon detecting any danger or dangerous or unsafe condition with any of the sensors or detectors in the sensor/detector system 650, can also provide an audible alarm, a siren blare, or an audible and verbal message, so as to alert the individual, or any individuals in close proximity to the apparatus 600, of any detected and respective danger or dangerous or unsafe condition.

In a preferred embodiment, the apparatus 600 can be equipped with any one or more, or all of, the herein-described sensors or detectors of the sensor/detector system 650 so as to monitor the environment in which the apparatus 600 is present and/or so as to monitor the environment in which the individual, or any pet or animal, being monitored with or by the apparatus 600 is present. If a danger, or a dangerous or unsafe condition, is sensed or detected by any sensor or detector of the sensor/detector system 650, then the apparatus 600, and/or the CPU 10 of the same, can provide an audible alarm, a siren blare, or an audible and verbal message, so as to alert the individual, or any individuals in close proximity to the apparatus 600, of the detected and respective danger or dangerous or unsafe condition.

The apparatus 600 can also generate an alert message or notification message, or the report, which can contain information regarding the day, data, time, and/or position or location of the apparatus 600, as can be determined by the global positioning system (GPS) 70 of the apparatus 600, along with information regarding the respective sensed or detected danger or dangerous of unsafe condition, which can be any one or more of, an unsafe temperature as sensed or detected by the thermometer 651, a sensed or detected unsafe level of heat as sensed or detected by the heat sensor 652A, a sensed or detected intense heat as sensed or detected by the sensor or detector for sensing intense heat 652B, a sensed or detected unsafe temperature, which can be either too cold or too hot, by the sensor for detecting or for sensing an unsafe temperature 653, a sensed or detected presence of smoke as sensed or detected by the smoke detector 654, a sensed or detected presence of fire as sensed or detected by the fire detector 655, a sensed or detected presence of natural gas as sensed or detected by natural gas detector or sensor 656, a sensed or detected presence of propane gas as sensed or detected by the propane detector or sensor 657, a sensed or detected presence of methane gas as sensed or detected by the methane detector or sensor 658, a sensed or detected presence of Freon gas as sensed or detected by the Freon detector or sensor 659, a sensed or detected presence of Chlorine gas a sensed or detected by the chlorine detector or sensor 660, a sensed or detected presence of carbon monoxide (CO) as sensed or detected by the carbon monoxide (CO) detector or sensor 661, and/or a sensed or detection of the presence of any other harmful substance or hazardous substance, as sensed or detected by a respective sensor or detector 662 for sensing any other gas or harmful substance or any other substance(s) or material(s).

In this regard, the apparatus 600 of the present invention allows an individual, or any pet or animal, to be notified, via the apparatus 600, of any sensed or detected danger, and/or of any sensed or detected dangerous or unsafe condition, at any time and anywhere he, she, or it may be located.

As used herein, the term "individual" means any human being, natural person, animal, non-human being animal, or pet. In this regard, the use of the various preferred and/or other embodiments or the apparatus 600, or any other apparatus described herein or otherwise, and methods of the present invention, can be utilized by and for, and to provide monitoring services or functions for, any individual or individuals which can be any human being(s), natural person(s), animal(s), non-human being animal(s), or pet(s). In this regard, the apparatus 600 or any other apparatus described herein or otherwise, and methods of the present invention, can be utilized in order to provide a personal monitoring and safety apparatus or device for any individual in or for which the apparatus 600 is being utilized.

Figure 12:
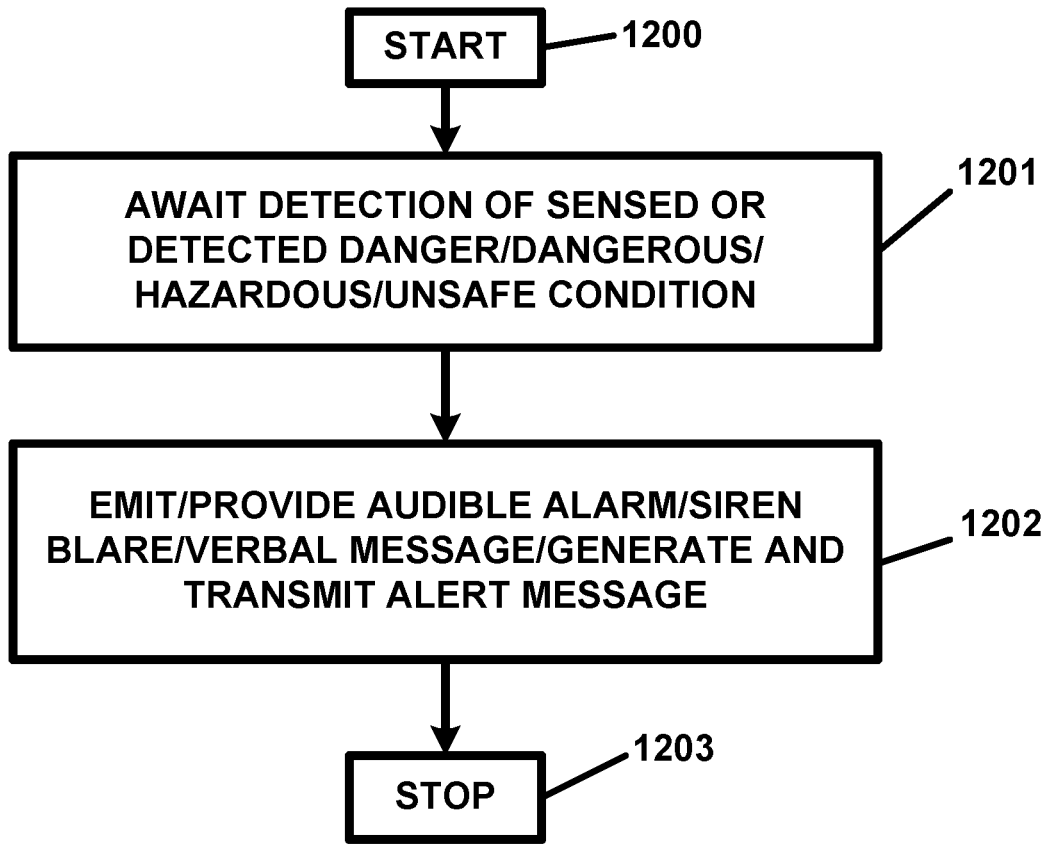
FIG. 12 illustrates another preferred embodiment operation of the apparatus of the present invention, in flow diagram form.

FIG. 12 illustrates another preferred embodiment operation of the apparatus 600 of the present invention, in flow diagram form. In the preferred embodiment of FIG. 12, the apparatus 600 is described as being utilized in connection with an individual or any age. In another preferred embodiment, the apparatus 600 and the preferred embodiment of FIG. 12 can be utilized in a same, a similar, and/or an analogous, manner in connection with any type or kind of pet or animal. In another embodiment of FIG. 12, any of the herein-described apparatus 100, apparatus 600, or any other apparatus described herein, can be utilized in a same, a similar, and/or an analogous, manner in connection with any individual of any age or in connection with any type or kind of pet or animal.

In another preferred embodiment, any other suitable or appropriate sensor or detector, for detecting any other dangerous condition or environmental condition, can also be utilized in connection with the apparatus 100, the apparatus 600, or any other apparatus described herein, in the preferred embodiment of FIG. 12.

With reference to FIG. 126, the operation of the apparatus 600 commences at step 1200. At step 1201, the apparatus 600 can await a detection of a sensed or detected danger or dangerous of unsafe condition, which can be any one or more of, an unsafe temperature as sensed or detected by the thermometer 651, a sensed or detected unsafe level of heat as sensed or detected by the heat sensor 652A, a sensed or detected intense heat as sensed or detected by the sensor or detector for sensing intense heat 652B, a sensed or detected unsafe temperature, which can be either too cold or too hot, by the sensor for detecting or for sensing an unsafe temperature 653, a sensed or detected presence of smoke as sensed or detected by the smoke detector 654, a sensed or detected presence of fire as sensed or detected by the fire detector 655, a sensed or detected presence of natural gas as sensed or detected by the natural gas detector or sensor 656, a sensed or detected presence of propane gas as sensed or detected by the propane detector or sensor 657, a sensed or detected presence of methane gas as sensed or detected by the methane detector or sensor 658, a sensed or detected presence of Freon gas as sensed or detected by the Freon detector or sensor 659, a sensed or detected presence of Chlorine gas a sensed or detected by the chlorine detector or sensor 660, a sensed or detected presence of carbon monoxide (CO) as sensed or detected by the carbon monoxide (CO) detector or sensor 661, and/or a sensed or detection of the presence of any other harmful substance or hazardous substance, as sensed or detected by a respective sensor or detector 662 for sensing any other gas or harmful substance or any other substance(s) or material(s), and/or which can be any one or more of, or any combination of, any number of the herein-described sensed or detected conditions. Upon the detection of any one of more of the herein-described sensed or detected conditions, by the sensor/detector system 650, or by any one of more of thermometer 651, the heat sensor 652A, the sensor or detector for sensing intense heat 652B, the sensor for detecting or for sensing an unsafe temperature 653, the smoke detector 654, the fire detector 655, the natural gas detector or sensor 656, the propane detector or sensor 657, the methane detector or sensor 658, the Freon detector or sensor 659, the chlorine detector or sensor 660, the carbon monoxide (CO) detector or sensor 661, and/or the sensor or detector 662, the operation of the apparatus 600 will proceed to step 1202.

At step 1202, the apparatus 600 will emit or provide, via the collision avoidance speaker 7, or via any other speaker of the apparatus 600, an audible alarm, siren blare, and/or verbal message, so as to alert the individual in connection with whom or which the apparatus 600 is being used, or any other persons or individuals in the vicinity of the apparatus 600, of the sensed or detected danger, or dangerous or unsafe condition, which was sensed or detected by the sensor/detector system 650, or by any one of more of thermometer 651, the heat sensor 652A, the sensor or detector for sensing intense heat 652B, the sensor for detecting or for sensing an unsafe temperature 653, the smoke detector 654, the fire detector 655, the natural gas detector or sensor 656, the propane detector or sensor 657, the methane detector or sensor 658, the Freon detector or sensor 659, the chlorine detector or sensor 660, the carbon monoxide (CO) detector or sensor 661, and/or the sensor or detector 662.

In a preferred embodiment, the audible alarm, siren blare, and/or verbal message, can contain information regarding the sensed or detected danger, or dangerous, hazardous, or unsafe, condition, which is sensed or detected, the nature of the same, the respective sensor or detector 651, 652A, 652B, 653, 654, 655, 656, 657, 658, 659, 660, 661, and/or 662, or any combination of the same, and/or any audible and/or verbal instructions directed to the individual associated with the apparatus 600, and/or any other persons or individuals in the vicinity of the apparatus 600, to either take action to eliminate or to alleviate the danger and/or to get to, or move to, a safe location.

In a preferred embodiment, the respective audible alarm, siren blare, or audible and verbal message, can be selected to be of any desired or suitable volume and/or of any desired or suitable frequency deemed suitable or appropriate for any individual or individuals with whom the apparatus 600 is being used. In another preferred embodiment, the respective audible alarm, siren blare, or audible and verbal message, can be selected to be of any desired or suitable volume and/or of any desired or suitable frequency deemed suitable or appropriate for any pet or pets, or for any animal or animals with whom or which the apparatus 600 is being used.

In a preferred embodiment, at step 1602, the apparatus 600 can provide the audible alarm, the siren blare, or the audible and verbal message, continuously or at intervals until the respective sensor or detector 651, 652A, 652B, 653, 654, 655, 656, 657, 658, 659, 660, 661, and/or 662, ceases sensing or detecting the respective danger or dangerous, hazardous, or unsafe, condition.

At step 1602, the apparatus 600 can generate an alert message which can be or which can include information regarding the sensed or detected danger or dangerous of unsafe condition, which can be any one or more of, the detected unsafe temperature ("unsafe temperature message"), the detected unsafe heat ("unsafe heat message"), the detected intense heat ("intense heats message"), the detected smoke ("smoke alert message"), the detected fire ("fire alert message"), the detected natural gas ("natural gas message"), the detected propane gas ("propane gas message"), the detected methane gas ("methane gas message"), the detected Freon gas ("Freon gas message"), the detected Chlorine gas ("Chlorine gas message"), the detected carbon monoxide (CO) ("carbon monoxide (CO) message"), and/or or the detected other harmful substance or hazardous substance ("hazardous substance message").

At step 1202, the apparatus 600 can transmit the alert message, which can be, or can include any one or more of the foregoing unsafe temperature message, unsafe heat message, intense heats message, smoke alert message, fire alert message, natural gas message, propane gas message, methane gas message, Freon gas message, Chlorine gas message, carbon monoxide (CO) message, and/or hazardous substance message, to the central processing computer 200, to a respective personal communication device(s) 300 of the parent, relative, or friend, or other authorized individual, and/or to a police or law enforcement communication device(s) 400. Thereafter, the operation of the apparatus 600 will cease at step 1203.

In another preferred embodiment, as well as any and/or all of the embodiments described herein, the case 1, 601, or any other case, described herein or otherwise, can be any case or housing of the respective apparatus in or with which it is being utilized, or the case 1, 601, or any other case, can be any protective case, casing, or housing, which can be applied to, affixed to, attached to, the respective apparatus with which it is utilized, or can be any protective case, casing, or housing, into which the respective apparatus can be inserted or encased within. In this regard, in a preferred embodiment, the case 1, 601, or any other case, described herein or otherwise, can be equipped with any of the herein-described components and/or sensors and can be connected to, or linked with, the respective CPU 10 of the respective apparatus of the present invention 100. In a preferred embodiment, any of the herein-described components and/or sensors and can be connected to, or linked with, the respective CPU 10 of the apparatus using any suitable wireless technology or equipment, Bluetooth technology or equipment, and/or any other suitable or appropriate wireless technology or equipment.

In a preferred embodiment, the case 1, 601, or any other case, described herein or otherwise can be applied to the respective apparatus, or can be removed from the respective apparatus, at any time.

As, noted herein, as used herein, the term "individual" means any human being, natural person, animal, non-human being animal, or pet. In this regard, the use of the various preferred and/or other embodiments or the apparatus and methods of the present invention can be utilized by and for, and to provide monitoring services or functions for, any individual or individuals which can be any human being(s), natural person(s), animal(s), non-human being animal(s), or pet(s).

In another preferred embodiment, as well as in any and/or all of the embodiments described herein and/or otherwise, the apparatus 100 and the apparatus 600 can be a wearable device, and/or can be attached or connected to or with a wearable device. In a preferred embodiment, the apparatus 100 and/or the apparatus 600 can be attached to or connected to a belt, an armband, a compression sleeve, a wristband, a watch, a wristwatch, a bracelet, a necklace, a body camera, a collar of any type or kind of pet or other animal, an ankle bracelet, a shoe, or any other article of clothing or clothing accessory and/or any other wearable item, device, or article.

In another preferred embodiment, as well as in any and/or all of the embodiments described herein and/or otherwise, the apparatus 100 and the apparatus 600, and/or the respective case 1 or case 601 can be, or can be integrated with or within a belt, an armband, a compression sleeve, a wristband, a bracelet, a necklace, a body camera, a collar of any type or kind of pet or other animal, an ankle bracelet, a shoe, or any other article of clothing or clothing accessory and/or any other wearable item, device, or article.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims which follow.

What is claimed is:

1. An apparatus, comprising:
a controller, wherein the controller controls an operation of the apparatus;
a camera, wherein the camera obtains a view, a picture, or a video;
a display, wherein the display displays information, the view, the picture, or the video obtained by the camera;
a speaker;
a global positioning system, wherein the global positioning system determines a position or a location of the apparatus;
a collision avoidance sensor, wherein the collision avoidance sensor detects an object, a structure, or an individual; and
a sensor or a detector, wherein the sensor or the detector senses or detects a dangerous, a hazardous, or an unsafe, condition at or in a vicinity of the apparatus,
wherein the controller or the apparatus automatically detects a texting operational mode, an e-mail operational mode, a game or gaming operational mode, or a speakerphone operational mode, of operation of the apparatus, and further wherein, in response to detecting the texting operational mode, the e-mail operational mode, the game or gaming operational mode, or the speakerphone operational mode, of operation of the apparatus, the controller or the apparatus activates the camera and activates the collision avoidance sensor, and further wherein, in response to detecting the texting operational mode, the e-mail operational mode, the game or gaming operational mode, or the speakerphone operational mode, of operation of the apparatus, the controller or the apparatus activates at least a portion of the display to display a view in front of, or an anticipated travel path of movement of, the apparatus, and further wherein the display simultaneously displays the view in front of, or the anticipated travel path of movement of, the apparatus and information for providing a continuing use of the texting operational mode, the e-mail operational mode, the game or gaming operational mode, or the speakerphone operational mode, of operation of the apparatus, and further wherein the controller or the apparatus detects a completion of the texting operational mode, the e-mail operational mode, the game or gaming operational mode, or the speakerphone operational mode, of operation of the apparatus and automatically deactivates the camera and the collision avoidance sensor upon a detected completion of the texting operational mode, the e-mail operational mode, the game or gaming operational mode, or the speakerphone operational mode, of operation of the apparatus, and further wherein the display displays the view obtained by the camera from a first time when the camera is activated until a second time when the camera is deactivated upon the detected completion of the texting operational mode, the e-mail operational mode, the game or gaming operational mode, or the speakerphone operational mode, of operation of the apparatus,
wherein the apparatus stores information regarding a safe area of travel, and further wherein the global positioning system determines a position or location of the apparatus, wherein the controller or the apparatus monitors a location of the apparatus to determine if the apparatus is located at a location outside of the safe area of travel, and wherein, if the apparatus is determined to be outside of the safe area of travel, the controller or the apparatus generates a notification message, and further wherein the apparatus transmits the notification message to a communication device of an authorized individual or to a police or law enforcement communication device,
wherein, in response to the sensor or the detector sensing or detecting the dangerous, the hazardous, or the unsafe, condition at or in the vicinity of the apparatus, wherein the dangerous, the hazardous, or the unsafe, condition is a detection of smoke, fire, natural gas, propane, methane, chlorine, or carbon monoxide (CO), the apparatus provides, via the speaker, an audible alarm, a siren blare, or a verbal message, containing information regarding the dangerous, the hazardous, or the unsafe, condition, and further wherein the controller or the apparatus generates an alert message, wherein the alert message contains information regarding the dangerous, the hazardous, or the unsafe, condition, and further wherein the apparatus transmits the alert message to a central processing computer, to the communication device of the authorized individual or to the police or law enforcement communication device.

2. The apparatus of claim 1, wherein the sensor or the detector is a thermometer.

3. The apparatus of claim 1, wherein the sensor or the detector is a sensor or detector for sensing heat.

4. The apparatus of claim 1, wherein the sensor or the detector is a smoke detector.

5. The apparatus of claim 1, wherein the sensor or the detector is a fire detector.

6. The apparatus of claim 1, wherein the sensor or the detector is a natural gas detector.

7. The apparatus of claim 1, wherein the sensor or the detector is a propane detector.

8. The apparatus of claim 1, wherein the sensor or the detector is a methane detector.

9. The apparatus of claim 1, further comprising:
a second sensor or a second detector, wherein the second sensor or the second detector is a refrigerant detector.

10. The apparatus of claim 1, wherein the sensor or the detector is a chlorine detector.

11. The apparatus of claim 1, wherein the sensor or the detector is a carbon monoxide (CO) detector.

12. The apparatus of claim 1, wherein the controller or the apparatus activates the collision avoidance sensor to detect an object, structure, or individual in the direction of a movement of, or in the vicinity of, the apparatus.

13. The apparatus of claim 1, wherein the apparatus is a cellular telephone or a smartphone.

14. The apparatus of claim 1, wherein the apparatus is a tablet computer, a portable gaming device, a handheld gaming device, a handheld video game console, or a portable game console.

15. The apparatus of claim 1, wherein the apparatus is a wearable device or is integrated with or within a wearable device.

16. The apparatus of claim 15, wherein the wearable device is a belt.

17. The apparatus of claim 15, wherein the wearable device is a body camera.

18. The apparatus of claim 15, wherein the wearable device is a watch or a wristwatch.

19. The apparatus of claim 15, wherein the wearable device is a collar for an animal.

20. The apparatus of claim 1, wherein the authorized individual is a parent, a relative, or a friend.

\* \* \* \* \*